(12) United States Patent
Kitaura

(10) Patent No.: US 8,179,367 B2
(45) Date of Patent: May 15, 2012

(54) ELECTRONIC APPLIANCE HAVING A DISPLAY AND A DETECTOR FOR GENERATING A DETECTION SIGNAL

(75) Inventor: Masahiro Kitaura, Kanagawa-ken (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 903 days.

(21) Appl. No.: 11/896,839

(22) Filed: Sep. 6, 2007

(65) Prior Publication Data
US 2008/0062125 A1   Mar. 13, 2008

(30) Foreign Application Priority Data

Sep. 8, 2006   (JP) ................................ P2006-243788

(51) Int. Cl.
*G09G 5/00* (2006.01)

(52) U.S. Cl. ........................................ 345/156; 345/162
(58) Field of Classification Search .................... None
See application file for complete search history.

(56) References Cited

U.S. PATENT DOCUMENTS

| | | | | |
|---|---|---|---|---|
| 5,051,929 A | * | 9/1991 | Tutt et al. ...................... | 345/593 |
| 5,528,263 A | * | 6/1996 | Platzker et al. ............... | 345/156 |
| 5,532,938 A | * | 7/1996 | Kondo et al. .................. | 708/524 |
| 6,771,277 B2 | * | 8/2004 | Ohba ............................ | 345/629 |
| 2001/0012001 A1 | * | 8/2001 | Rekimoto et al. ............. | 345/173 |
| 2002/0041327 A1 | * | 4/2002 | Hildreth et al. ............... | 348/42 |
| 2002/0064382 A1 | * | 5/2002 | Hildreth et al. ............... | 396/100 |
| 2002/0105623 A1 | * | 8/2002 | Pinhanez ....................... | 353/69 |
| 2006/0079324 A1 | * | 4/2006 | Watanabe et al. .............. | 463/30 |

FOREIGN PATENT DOCUMENTS

| | | |
|---|---|---|
| JP | 2004-272515 | 9/2004 |
| JP | 2004-355494 | 12/2004 |
| JP | 2006-091948 | 4/2006 |

* cited by examiner

*Primary Examiner* — Alexander Eisen
*Assistant Examiner* — Matthew Yeung
(74) *Attorney, Agent, or Firm* — The Nath Law Group; Jerald L. Meyer; Robert T. Burns

(57) ABSTRACT

An electronic appliance includes detectors that are assigned to detection zones defined on a display. The detection zones correspond to push buttons that are arranged in an operation menu displayed on the display. Each of the detectors includes a temporal difference filter. The temporal difference filter includes a detection zone image memory, a peripheral zone image memory, a subtracter, and a motion quantity calculator. The detection zone image memory stores an image of the corresponding detection zone. The peripheral zone image memory stores an image of a peripheral detection zone defined around the corresponding detection zone. The subtracter finds a difference between the image stored in the peripheral zone image memory and a present image of the peripheral detection zone. According to the difference, the motion quantity calculator calculates first data representative of the size of an object that is present in the peripheral detection zone. The electronic appliance also includes a temporal difference filter controller that generates a first detection flag according to the first data, and according to the first detection flag, generates a write stop flag to stop writing to the detection zone image memory.

6 Claims, 22 Drawing Sheets

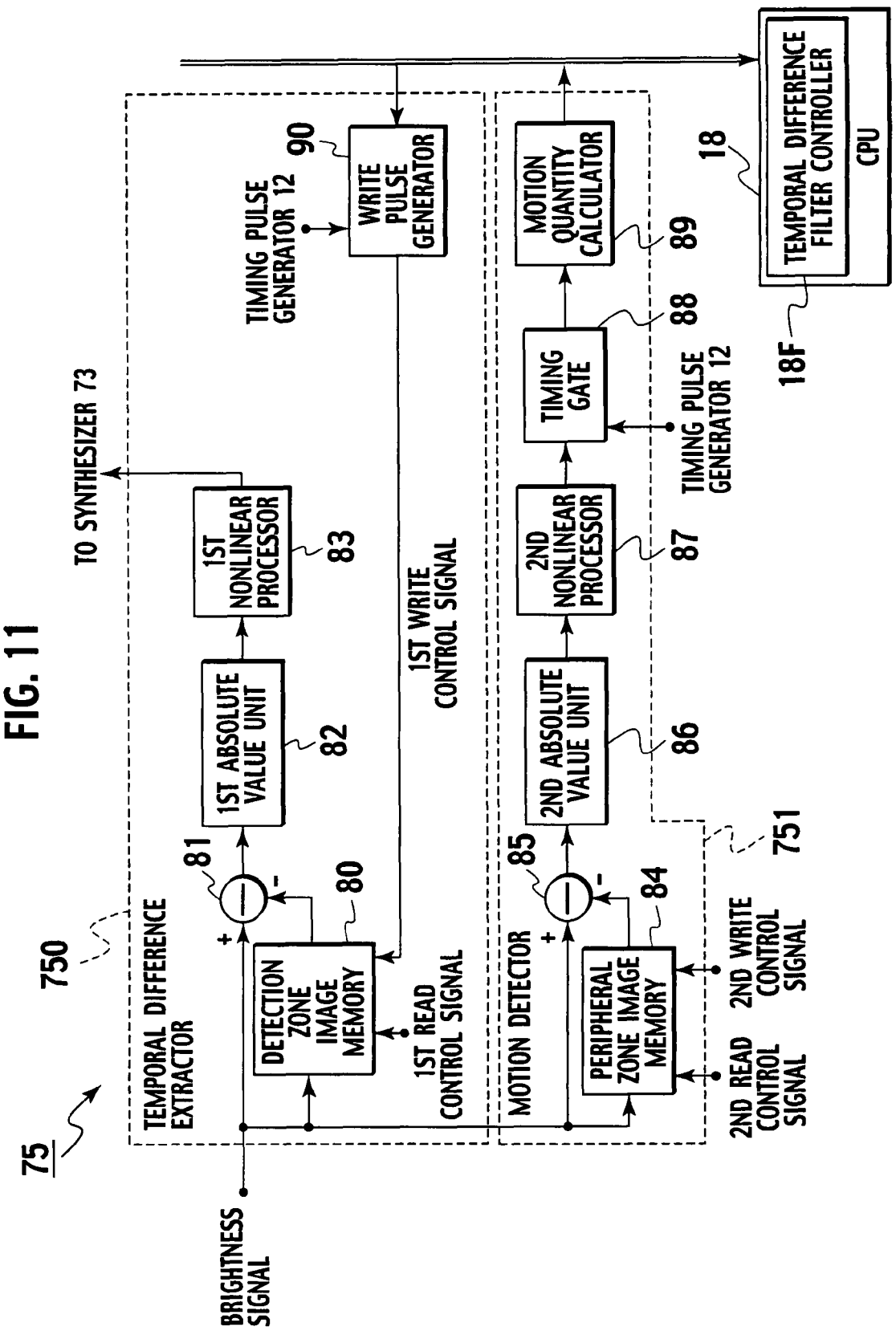

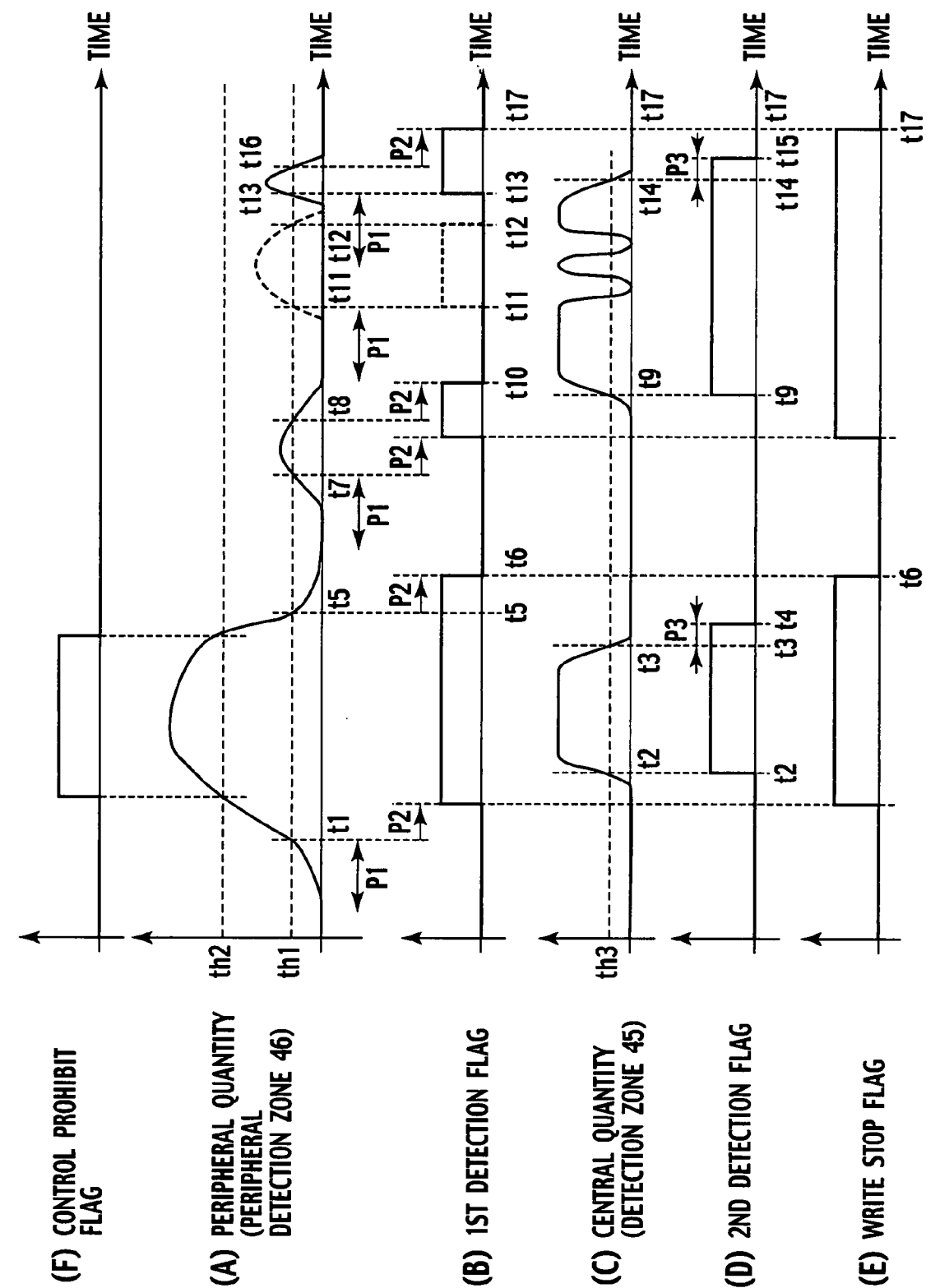

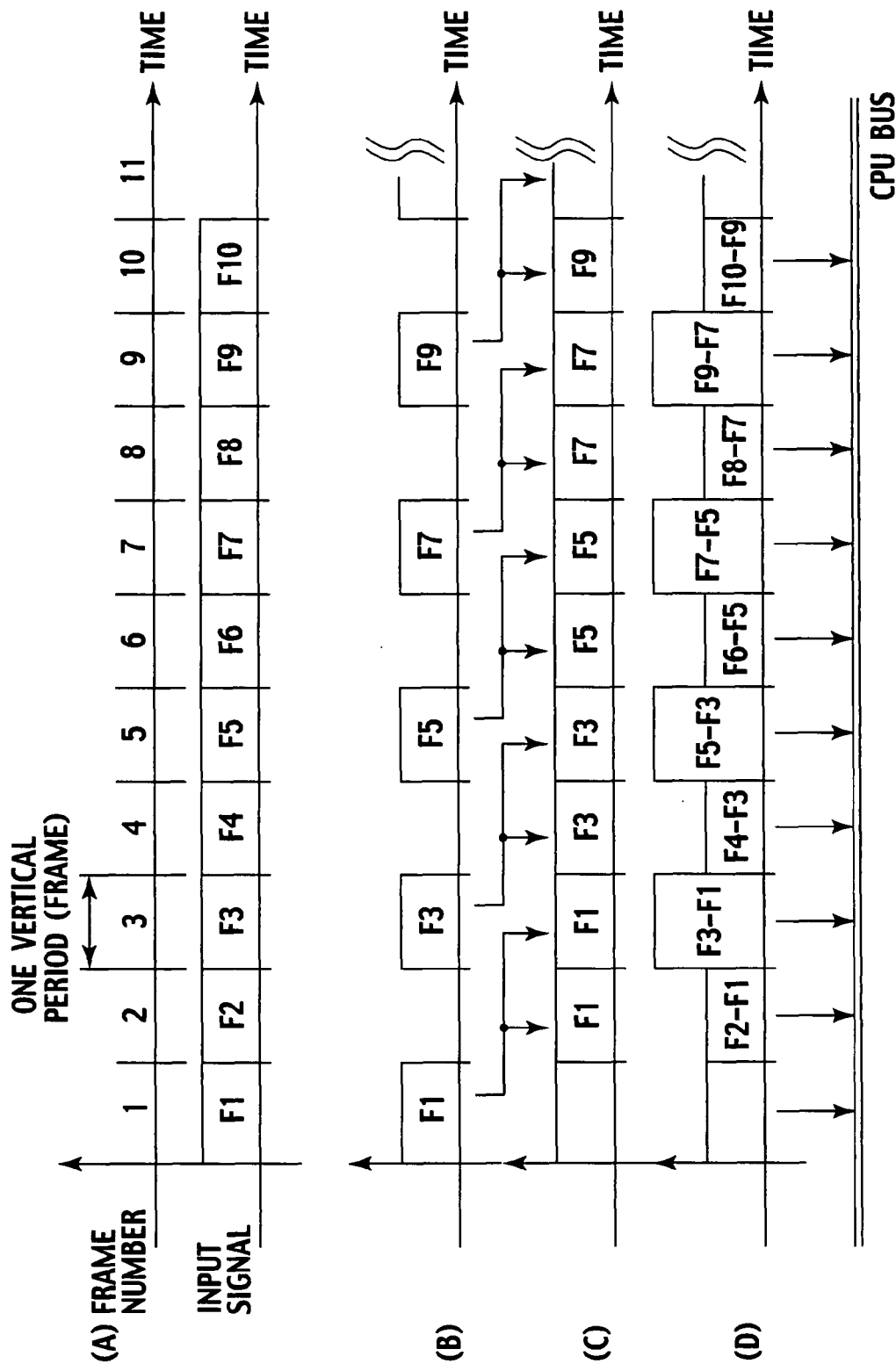

ELECTRONIC APPLIANCE HAVING A DISPLAY AND A DETECTOR FOR GENERATING A DETECTION SIGNAL

BACKGROUND OF THE INVENTION

1. Field of the Invention

The present invention relates to an electronic appliance, and particularly, to an electronic appliance having a display, such as a television set and a personal computer, provided with an improved remote control function.

2. Description of Related Art

In the 1980s, infrared remote controllers started to be attached to home appliances such as television sets. The remote controllers have widely accepted and greatly changed the usage of home appliances. At present, controlling electronic appliances with the remote controllers is in the mainstream. The remote controller basically employs a one-key (one-button), one-function operation. A remote controller for the television set, for example, has ON/OFF, CHANNEL, VOLUME, and INPUT SELECT keys for conducting respective functions. The remote controller is very useful for remotely controlling the television set and electronic devices connected to the television set.

Data broadcasting that has started recently requires a remote controller to be provided with UP, DOWN, LEFT, RIGHT, and OK keys, and the user must push these keys several times to display a necessary menu. This is troublesome for the user. An EPG (electronic program guide) displays a matrix of guides and prompts the user to select a desired one of the guides by pushing keys on the remote controller. This is also troublesome for the user.

A related art proposed by this applicant in Japanese Unexamined Patent Application Publication No. 2006-091948 discloses a remote-control technique that uses no remote controller at hand and is flexibly applicable to a variety of electronic apparatuses. This technique employs a video camera to photograph the hand of a user moved with respect to a control button displayed on a display, and according to the hand's movement, identifies a control operation assigned to the control button.

This related art is capable of correctly detecting a hand motion of the user carried out with respect to a control button displayed on a display. The related art, however, is not good at detecting a hand motion when a background color of the hand photographed by the video camera is similar to the color of the hand itself. There is, therefore, a need for providing a technique to correctly detect a control button manipulating operation conducted by a subject (hand) even if a background color of the subject is similar to the color of the subject itself.

SUMMARY OF THE INVENTION

An object of the present invention is to provide an electronic appliance capable of surely detecting an operation conducted with, for example, a hand motion with respect to a control button displayed on a display.

In order to accomplish the object, a first aspect of the present invention provides an electronic appliance having a display 21; a video camera 2 configured to photograph an operator 3 who is in front of the display; a mirror converter 13 configured to form a mirror image of the image photographed by the video camera; an operational image generator 15 configured to generate an operational image 41 containing at least one control button (1-1 to 1-8); a mixer 16 configured to mix the mirror image with the operational image into a mixed image; a detector 17 configured to generate a detection signal representative of an operation conducted by the operator with an item of the operator with respect to the control button contained in the mixed image displayed on the display; and a controller 18 configured to carry out a control operation according to the detection signal. The detector 17 includes a first memory 80 configured to store an image of a detection zone 45 of the mirror image, the detection zone corresponding to the control button displayed on the display; a second memory 84 configured to store an image of a peripheral detection zone (46, 461) of the mirror image, the peripheral detection zone being defined around the detection zone; a first subtracter 81 configured to find a difference between a present image of the detection zone and the image stored in the first memory, and according to the difference, output an image signal indicative of an area of the item in the detection zone; a second subtracter 85 configured to find a difference between a present image of the peripheral detection zone and the image stored in the second memory, and according to the difference, output an image signal indicative of an area of the item in the peripheral detection zone; a generator 32 configured to generate the detection signal according to the image signal indicative of the area of the item in the detection zone output from the first subtracter; and a calculator 89 configured to calculate, according to the image signal indicative of the area of the item output from the second subtracter, first data representative of the size of the item in the peripheral detection zone. The electronic appliance further has a write controller 18 configured to control writing to the first memory according to the first data.

According to a second aspect of the present invention that is based on the first, aspect, the write controller has a first flag generator 180 configured to generate a first flag according to a period in which the first data is above a first threshold; a second flag generator 181 configured to calculate second data representative of the size of the item in the detection zone and generate a second flag according to a period in which the second data is above a second threshold; and a third flag generator 187 configured to generate a write stop flag according to the first and second flags, to stop writing to the first memory.

According to a third aspect of the present invention that is based on the second aspect, the first flag generator generates the first flag a predetermined period after the first data exceeds the first threshold.

According to a fourth aspect of the present invention that is based on the third aspect, the first flag generator generates a fourth flag when the first data exceeds the first threshold, and the third flag generator generates the write stop flag according to the first, second, and fourth flags.

According to a fifth aspect of the present invention that is based on the second aspect, the first flag generator generates a fifth flag according to a period in which the first data is above a third threshold, and the controller stops the control operation according to the fifth flag.

According to a sixth aspect of the present invention that is based on the first aspect, the electronic appliance further has an adder configured to add brightness and color signals that form the mirror image to each other and provide a sum signal. The sum signal forms the images stored in the first and second memories.

The electronic appliance according to any one of the aspects of the present invention can surely detect an operation conducted with, for example, a hand motion with respect to a control button displayed on a display.

The nature, principle and utility of the invention will become more apparent from the following detailed description when read in conjunction with the accompanying drawings.

BRIEF DESCRIPTION OF THE DRAWINGS

In the Accompanying drawings:

FIG. 11 is a block diagram showing a temporal difference filter in the object extractor shown in FIG. 7;

FIG. 19 is a view explaining operation of the temporal difference filter and control information determination unit (CPU) shown in FIG. 17 based on an algorithm according to an embodiment of the present invention;

FIG. 22 is a view explaining operation of a temporal difference filter controller shown in FIG. 11;

DETAILED DESCRIPTION OF EMBODIMENTS

Figure 1:
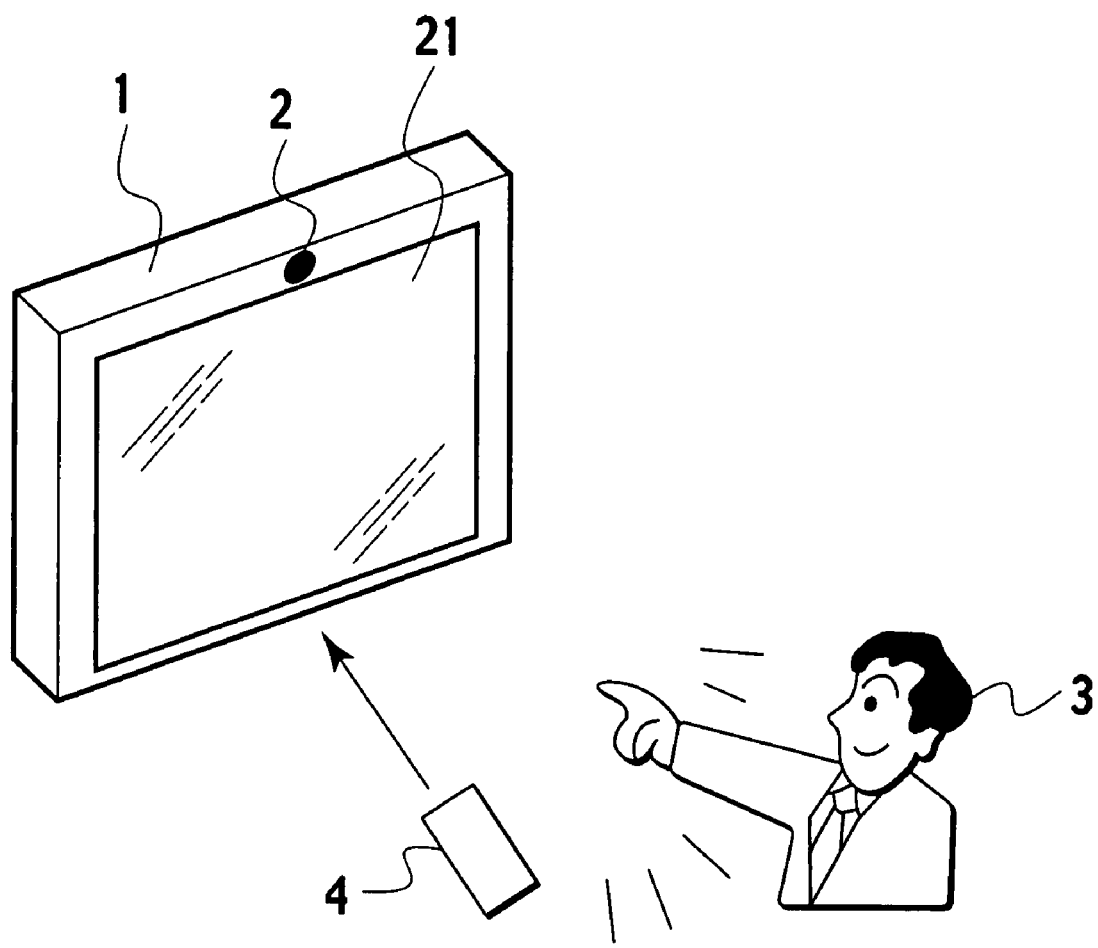
FIG. 1 is a view roughly explaining operation of an electronic appliance according to an embodiment of the present invention.

FIG. 1 shows a difference between an operation using a remote controller according to a related art and an operation according to the present invention. A user (operator) 3 operates a television set 1 serving as an example of an electronic appliance.

According to the related art, the user 3 must hold the remote controller 4, direct the remote controller 4 toward the television set 1, and push a key of required function on the remote controller 4 to control the television set 1. If the remote controller 4 is not present nearby, the user 3 is unable to control the television set 1, and therefore, must feel inconvenience.

On the other hand, the present invention provides the television set 1 with a video camera 2. The video camera 2 photographs the user 3. From an image of the user 3 provided by the video camera 2, a motion of the user 3 is detected and a control operation corresponding to the detected motion is carried out with respect to the television set 1 or any other device connected to the television set 1.

A motion of the user 3 to be detected is a motion of the body (hand, foot, face, and the like) of the user 3 intended to select a necessary one of buttons in a menu displayed on a display 21 of the television set 1. Embodiments of the present invention mentioned below use hand motions to control electronic appliances. If an environment of the television set 1 is dim, a remote control device (handy controller) having a light emitting function may be employed to carry out a motion equivalent to a hand motion.

Figure 2:
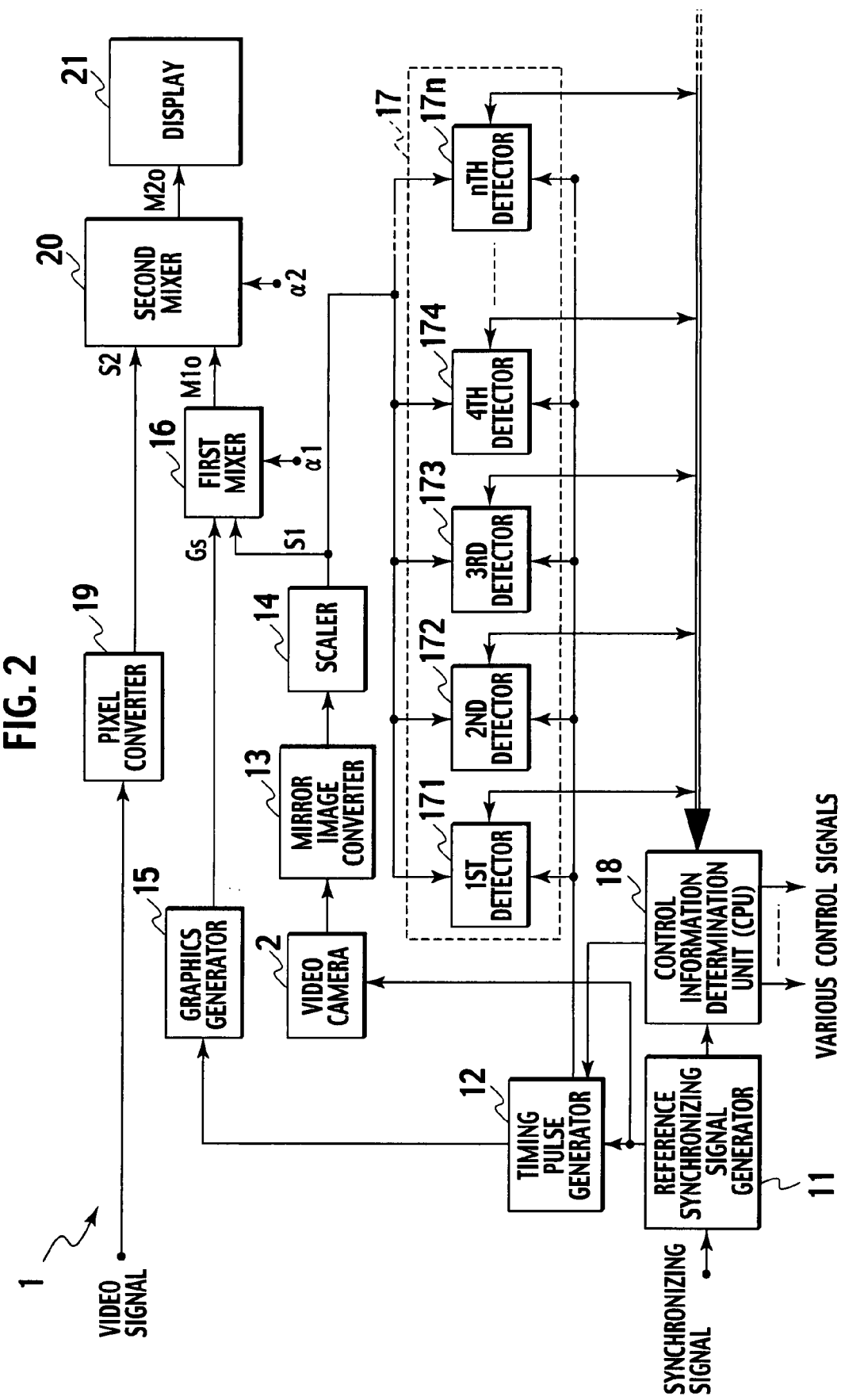
FIG. 2 is a block diagram showing parts of an electronic appliance (television set 1) according to an embodiment of the present invention.

FIG. 2 is a block diagram showing examples of parts in the television set 1 according to an embodiment of the present invention. The television set 1 has a video camera 2, a reference synchronizing signal generator 11, a timing pulse generator 12, a mirror image converter 13, a scaler 14, a graphics generator 15, a first mixer 16, a detection unit 17, a control information determination unit (realized in a CPU, and therefore, hereinafter referred to as CPU) 18, a pixel converter 19, a second mixer 20, and a display 21.

The reference synchronizing signal generator 11 generates, based on input synchronizing signals, horizontal periodic pulses and vertical periodic pulses as reference signals for the television set 1. The input synchronizing signals are contained in video signals supplied to the pixel converter 19. When receiving television broadcasting signals or video signals from an external device, the generator 11 generates pulses synchronized with synchronizing signals contained in the received signals. The timing pulse generator 12 generates pulses having optional phases and widths in horizontal and vertical directions for the respective blocks shown in FIG. 2.

The video camera 2 is arranged at a front part of the television set 1 as shown in FIG. 1 and photographs the user (operator) 3 or an object in front of the television set 1. The video camera 2 outputs a brightness signal (Y) and color difference signals (R−Y, B−Y) in synchronization with the horizontal and vertical periodic pulses provided by the reference synchronizing signal generator 11.

The mirror image converter 13 horizontally flips an image (of the user 3) photographed by the video camera 2 into a mirror image, which is displayed on the display 21. If the video camera 2 provides an image of a character, it is horizontally inverted like a character image reflected from a mirror. This embodiment employs memories to horizontally flip an image into a mirror image. If the display 21 is a CRT (cathode ray tube), a horizontal deflecting operation may be reversely carried out to horizontally invert an image into a mirror image. In this case, other images or graphics to be mixed with an image from the video camera 2 must be horizontally inverted in advance.

The scaler 14 adjusts the size of the image photographed by the video camera 2. Under the control of the CPU 18, the scaler 14 two-dimensionally adjusts an expansion ratio or a contraction ratio of a given image. Instead of expansion or contraction, the scaler 14 may adjust the horizontal and vertical phases of a given image.

The graphics generator 15 forms a menu (an operational image) according to a menu signal transferred from the CPU 18. If the menu signal is a primary color signal involving R (red), G (green), and B (blue) signals, the graphics generator 15 generates, from the primary color signal, a Y (brightness) signal and color difference (R−Y, B−Y) signals, which are synthesized or mixed with an image signal in a later stage. The number of planes of the generated graphics is optional. In this embodiment, the number of planes is one.

The number of pixels of the generated graphics according to the embodiment is equal to the number of pixels of the display 21. If they are not equal to each other, a pixel converter will be arranged in or after the graphics generator 15 to equalize the pixel numbers.

The first mixer 16 mixes an output signal Gs of the graphics generator 15 with, an output signal S1 of the scaler 14 according to a control value α1 that controls a mixing ratio. The first mixer 16 provides an output signal M1o as follows:

$$M1o = \alpha 1 \times S1 + (1-\alpha 1) \times Gs \quad (1)$$

The control value α1 is set between 0 and 1. As the control value α1 increases, a proportion of the scaler output signal S1 increases and a proportion of the output signal Gs of the graphics generator 15 decreases. This configuration of the mixer does not limit the present invention. The present invention is achievable with any mixer that receives two systems of signal information.

The detection unit 17 includes a first detector 171, a second detector 172, . . . , and an "n"th detector 17n. The number of detectors in the detection unit 17 is dependent on the number of push buttons contained in the menu provided by the graphics generator 15. The push buttons in the menu are associated with control operations to be carried out on the television set 1 or on any device connected to the television set 1.

The CPU (or control information determination unit) 18 analyzes data (detection signals) provided by the detection unit 17 and outputs various control signals. Based on the data from the detection unit 17, the CPU 18 generates a control signal corresponding to a manipulated one of the push buttons, to control a corresponding part of the television set 1. The CPU 18 employs software to conduct various operations. Algorithms of the software will be explained later. To carry out various operations, the embodiment employs hardware (functional blocks) and software (in the CPU 18). Classification of the operations into hardware executable operations and software executable operations is not essential for the present invention.

The pixel converter 19 converts pixel counts, to equalize the number of pixels of an external input signal with the number of pixels of the display 21. The external input signal is a signal coming from the outside of the television set 1, such as a broadcasting television signal (including a data broadcasting signal) received by a built-in tuner (not shown) or a video (VTR) signal. From the external input signal, horizontal and vertical synchronizing signals are extracted (not shown), and the reference synchronizing signal generator 11 synchronizes the respective parts of the television set 1 based on the horizontal and vertical synchronizing signals.

The second mixer 20 functions like the first mixer 16. The second mixer 20 mixes the output signal M1o of the first mixer 16 with an output signal S2 of the pixel converter 19 at a control value α2 that controls a mixing ratio. The second mixer 20 provides an output signal M2o as follows:

$$M2o = \alpha 2 \times M1o + (1-\alpha 2) \times S2 \quad (2)$$

The control value α2 is set between 0 and 1. As the control value α2 increases, a proportion of the output signal M1o from the first mixer 16 increases and a proportion of the output signal S2 from the pixel converter 19 decreases. The mixer 20 is not limited to the above-mentioned configuration. The mixer 20 may employ any configuration that receives two systems of signal information.

The display 21 may be a CRT, an LCD (liquid crystal display), a PDP (plasma display panel), a projection display, or the like. The display 21 may employ any proper display method. The display 21 receives a brightness signal Y and color difference signals R−Y and B−Y, converts them into R, G, and B primary color signals, and displays an image according to the signals.

Figure 3:
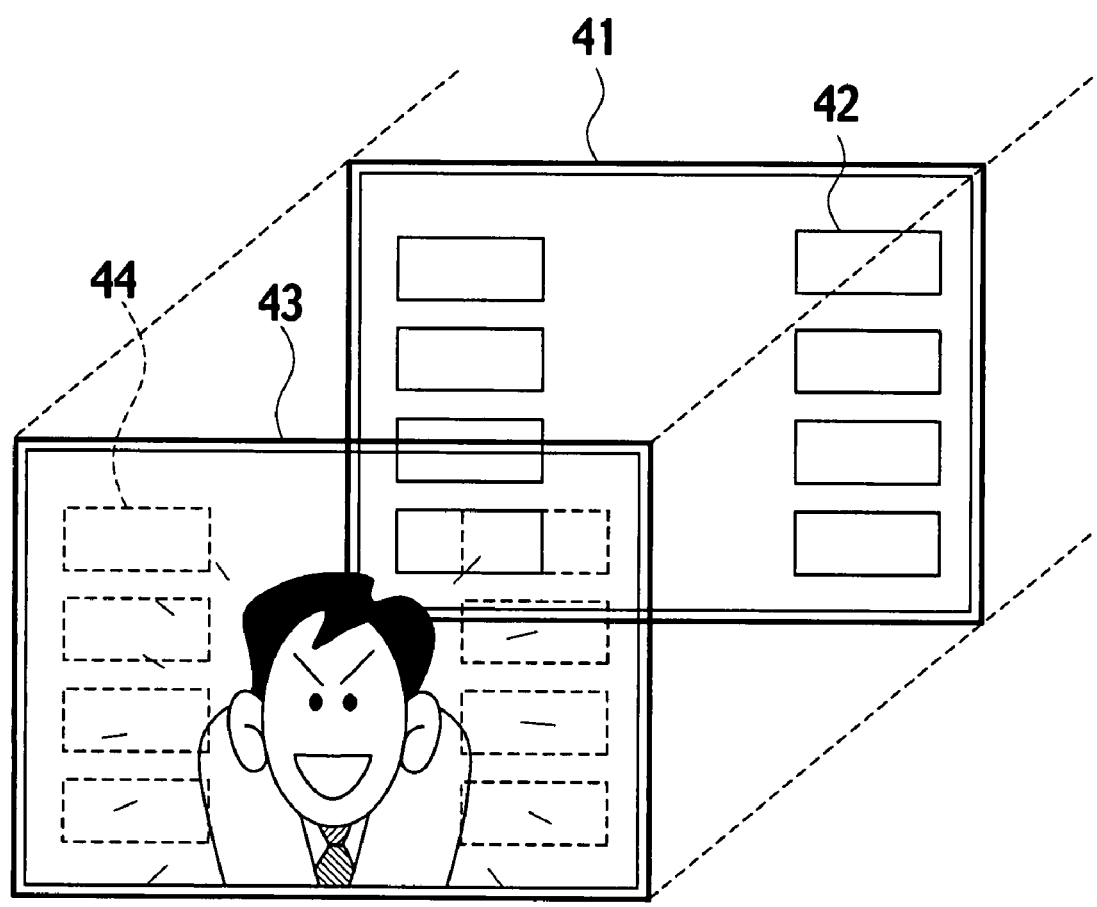
FIG. 3 is a view showing an operator's image and an operational image.

Operation of the television set 1 with the above-mentioned configuration, as well as operation conducted by the user 3 will be explained. FIG. 3 shows a graphics image 41 provided by the graphics generator 15 and a scaler output image 43 provided by the scaler 14. The scaler output image 43 is formed by converting an image photographed by the video camera 2 into a mirror image and by scaling the mirror image so that the number of pixels of the scaler output image 43 is equalized with the number of pixels of the graphics image 41. The first mixer 16 mixes the images 41 and 43 with each other.

The graphics image 41 consists of a menu plane (operational image) used for controlling the television set 1 and devices related to the television set 1 and includes rectangular push buttons (control buttons) 42. The scaler output image 43 includes a mirror image of the user 3 and rectangular frames 44 indicated with dotted lines. The rectangular frames 44 are detection zones corresponding to the detectors 171 to 17n of the detection unit 17. The frames 44 are arranged at the same positions as the push buttons 42 of the graphics image 41.

Figure 4:
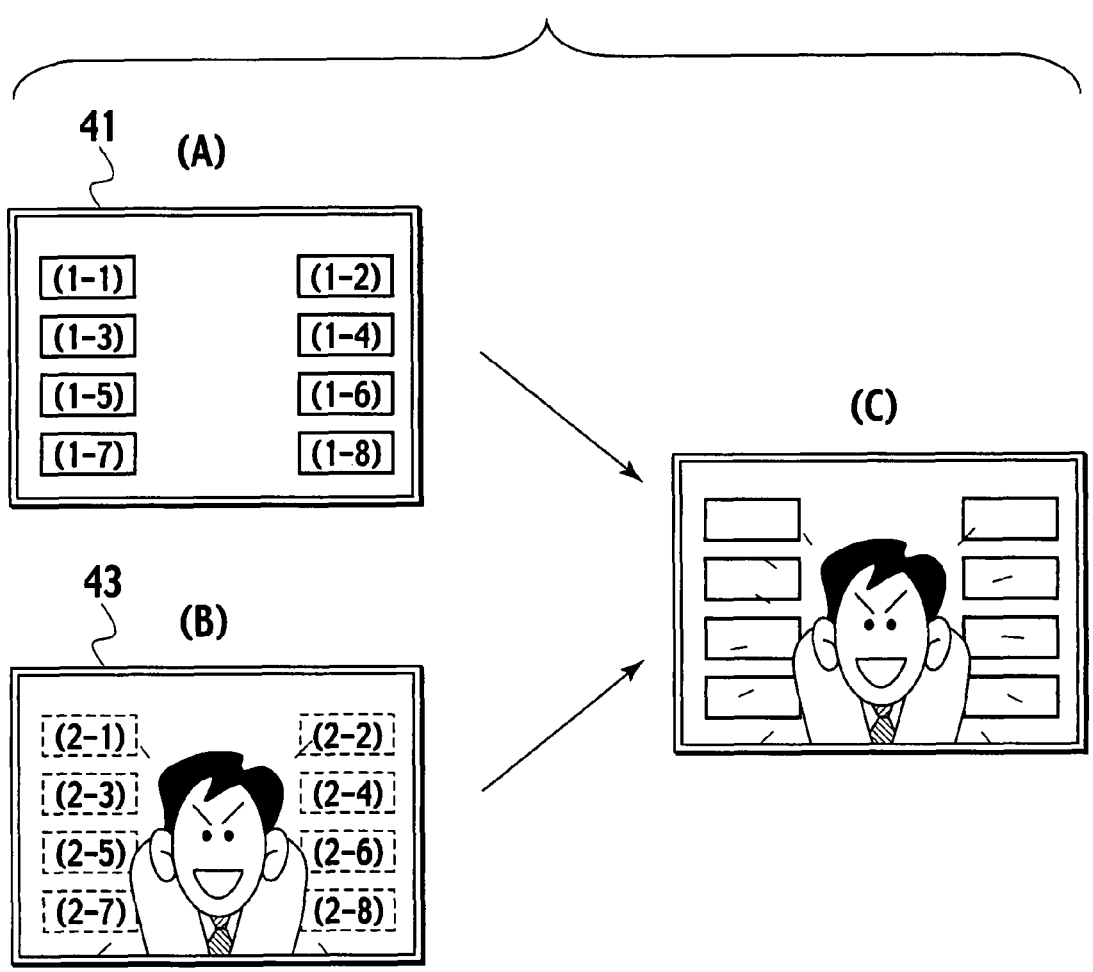
FIG. 4 is a view explaining mixing the operator's image and operational image shown in FIG. 3.

FIG. 4 shows a mixing process carried out in the first mixer 16. In FIG. 4, a picture (A) is the menu (graphics image) 41 generated by the graphics generator 15 and includes the push buttons 1-1 to 1-8. A picture (B) of FIG. 4 shows the scaler output image 43 containing the image of the user 3 that has been photographed by the video camera 2, mirror-converted by the mirror converter 13, and scaled by the scaler 14. The picture (B) includes the detection zones 2-1 to 2-8 corresponding to the detectors 171 to 17n of the detection unit 17.

A picture (C) of FIG. 4 is formed in the first mixer 16 by mixing the pictures (A) and (B) at a control value α1 representing a mixing ratio. In proportion to the control value α1, the brightness and contrast of the image of the user 3 in the picture (C) are lower than those of the picture (B).

The overlapped user's mirror image and control menu are displayed on the display 21. As a result, the user 3 can observe on the display 21 each movement of the user 3 together with the control menu including the push buttons 1-1 to 1-8. To control the television set 1, the user 3 moves his or her body (hand) to touch one of the push buttons 1-1 to 1-8 on the display 21.

Touching the push buttons 1-1 to 1-8 does not mean for the user 3 to actually touch the display 21. Instead, the user 3 moves his or her hand so that the image of the hand of the user 3 displayed on the display 21 may touch the push buttons 1-1 to 1-8 on the display 21. Namely, the user 3 acts while watching the display 21 so that his or her hand may be positioned on one of the push buttons 1-1 to 1-8 on the display 21, to activate a control operation assigned to the button to be carried out with respect to the television set 1.

When the user 3 conducts an action of pushing one of the push buttons 1-1 to 1-8 on the display 21, the detection unit 17 detects one of the detection zones 2-1 to 2-8 in which the hand is present and with which the pushed button is associated and recognizes that the button has been pushed. The detection unit 17 informs the CPU 18 of the detected result, and the CPU 18 outputs a control signal to carry out a control operation assigned to the pushed button. At this time, the shape and/or color of the pushed button on the display 21 may be changed to indicate that the button pushing action has been accepted. For example, the appearance of the pushed button on the display 21 may be changed to a pushed shape.

Figure 5:
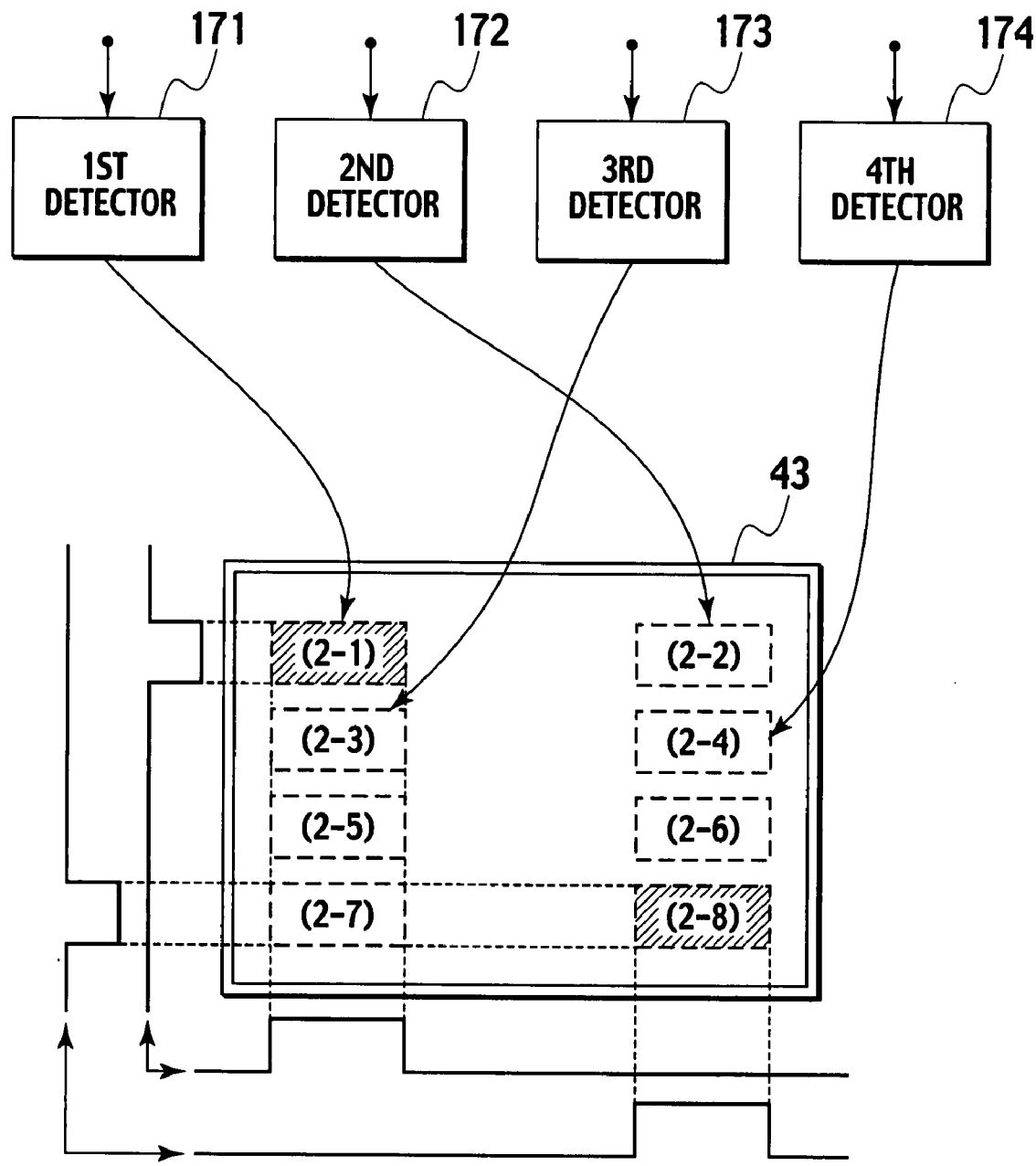
FIG. 5 is a view showing relationships between detectors in the electronic appliance of FIG. 2 and detection zones defined on a display.

FIG. 5 shows relationships between the detection zones 2-1 to 2-8 defined in the scaler output image 43 and the detectors 171 to 174 of the detection unit 17. FIG. 5 also shows horizontal and vertical timing pulses used to specify the detection zones 2-1 and 2-8.

Figure 6:
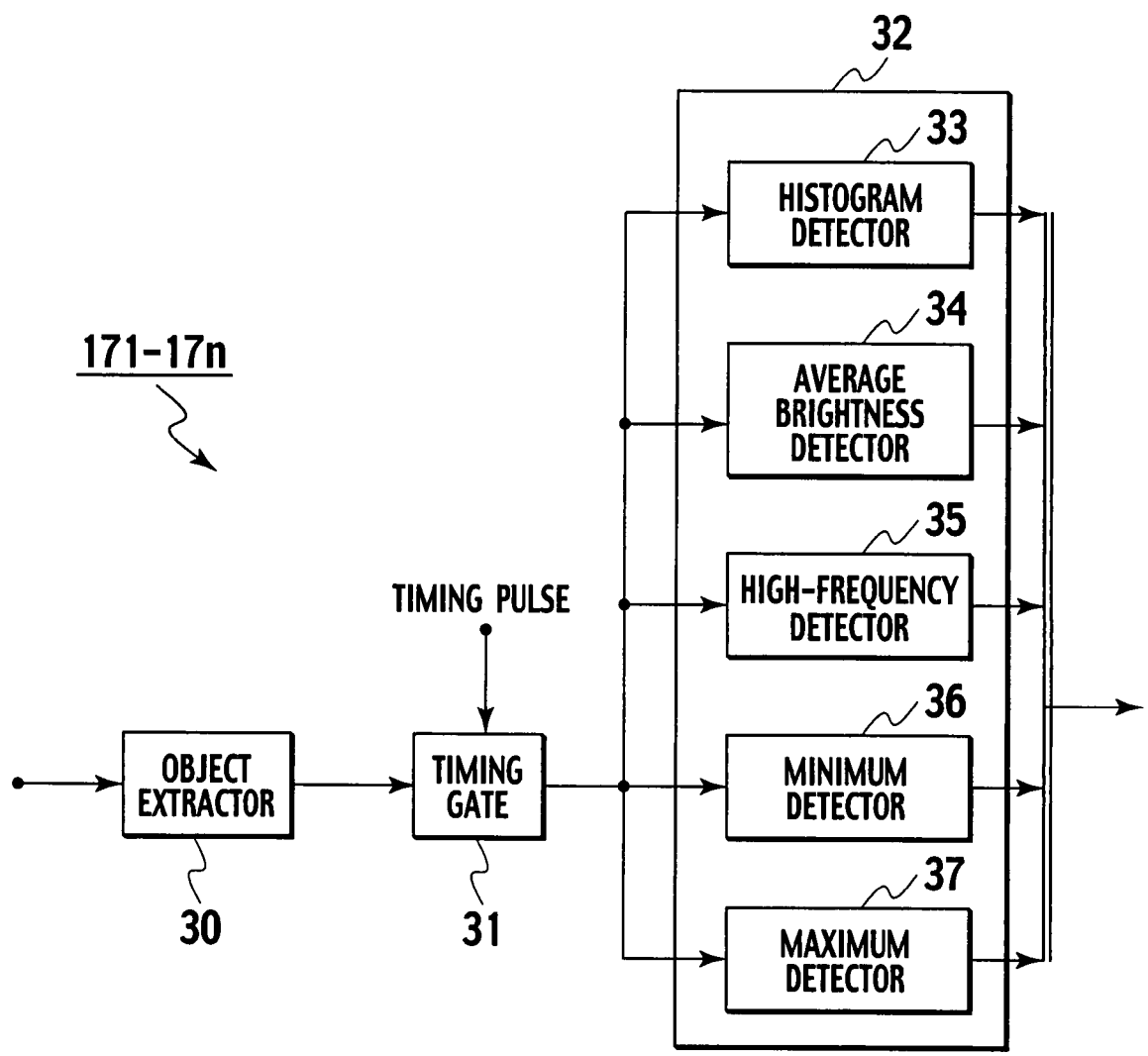
FIG. 6 is a block diagram showing one of the detectors shown in FIG. 2.

FIG. 6 shows one of the detectors 171 to 17n. Each detector includes an object extractor 30, a timing gate 31, and a feature detector 32. The object extractor 30 has filters for filtering the characteristics of an object and provides the timing gate 31 with a filtered image signal. In response to timing pulses such as those shown in FIG. 5, the timing gate 31 passes an image signal representative of a specified one of the detection zones 2-1 to 2-8.

For the image signal representative of the specified detection zone, the feature detector 32 carries out various filtering processes to extract an image of the hand of the user 3 photographed by the video camera 2. According to this embodiment, each of the detectors 171 to 17n is provided with the object extractor 30. The object extractors 30 may have an identical function, and in this case, only one object extractor may be sufficient for the detectors 171 to 17n.

Figure 7:
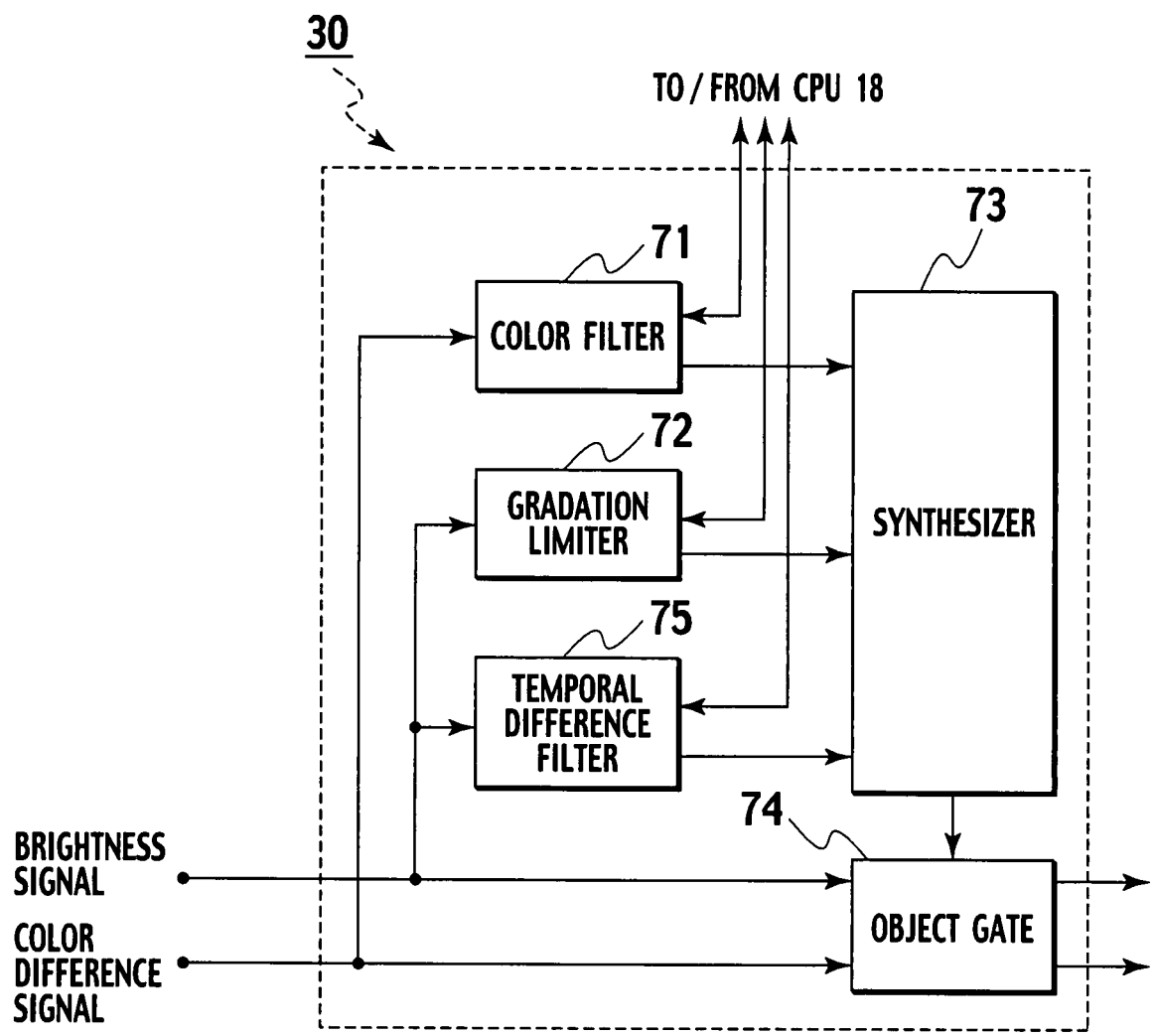
FIG. 7 is a block diagram showing an object extractor in the detector of FIG. 6.

FIG. 7 is a block diagram showing the details of the object extractor 30. The object extractor 30 carries out filtering processes to detect the hand of the user 3. For this, the object extractor 30 has a color filter 71, a gradation limiter 72, a temporal difference filter 75, a synthesizer 73, and an object gate 74.

The color filter 71, gradation limiter 72, and temporal difference filter 75 are used to identify the characteristics of an object, i.e., a hand. The color filter 71 limits the hue and color depth (degree of saturation) of a color signal consisting of color difference signals. The gradation limiter 72 limits a specific gradation range in a brightness signal.

Limiting a hue and a saturation degree through the color filter 71 is to pick up a human skin color. The human skin color, however, is affected by degrees of tan, races, and the like. Namely, there are various skin colors. According to control signals from the CPU 18, the color filter 71 adjusts a hue and saturation degree and the gradation limiter 72 adjusts a gradation range for a brightness signal, to roughly detect a human hand.

In addition, the temporal difference filter 75 extracts a hand area according to a slight brightness difference between the hand and the background of the hand even if the background has a color similar to the color of the hand.

The present invention can detect not only a human hand but also any object that manipulates the push buttons 1-1 to 1-8, by adjusting and optimizing the hue and gradation parameters used by the object extractor 30.

The details of the temporal difference filter 75 will be explained later.

The synthesizer 73 receives signals from the color filter 71, gradation limiter 72, and temporal difference filter 75 and synthesizes the received signals into an intraregional pulse. This intraregional pulse will be high if signals passed through the color filter 71, gradation limiter 72, and temporal difference filter 75 are all high (AND). It is possible to make the intraregional pulse high if there is one or two high-level signals passed through the color filter 71, gradation limiter 72, and temporal difference filter 75.

If the intraregional pulse is set to high when there are two high-level signals passed through the color filter 71, gradation limiter 72, and temporal difference filter 75, erroneous detection will be prevented. If the intraregional pulse is set to high when there are three high-level signals passed through the color filter 71, gradation limiter 72, and temporal difference filter 75, erroneous detection will more surely be prevented.

The intraregional pulse from the synthesizer 73 is supplied to the object gate 74. If the intraregional pulse is high, the object gate 74 passes the brightness and color difference signals. If the intraregional pulse is low, the object gate 74 blocks the brightness and color difference signals and outputs signals of predetermined values. According to the embodiment, the signals of predetermined values are a black-level brightness signal and color difference signals of saturation degree of zero.

Figure 8:
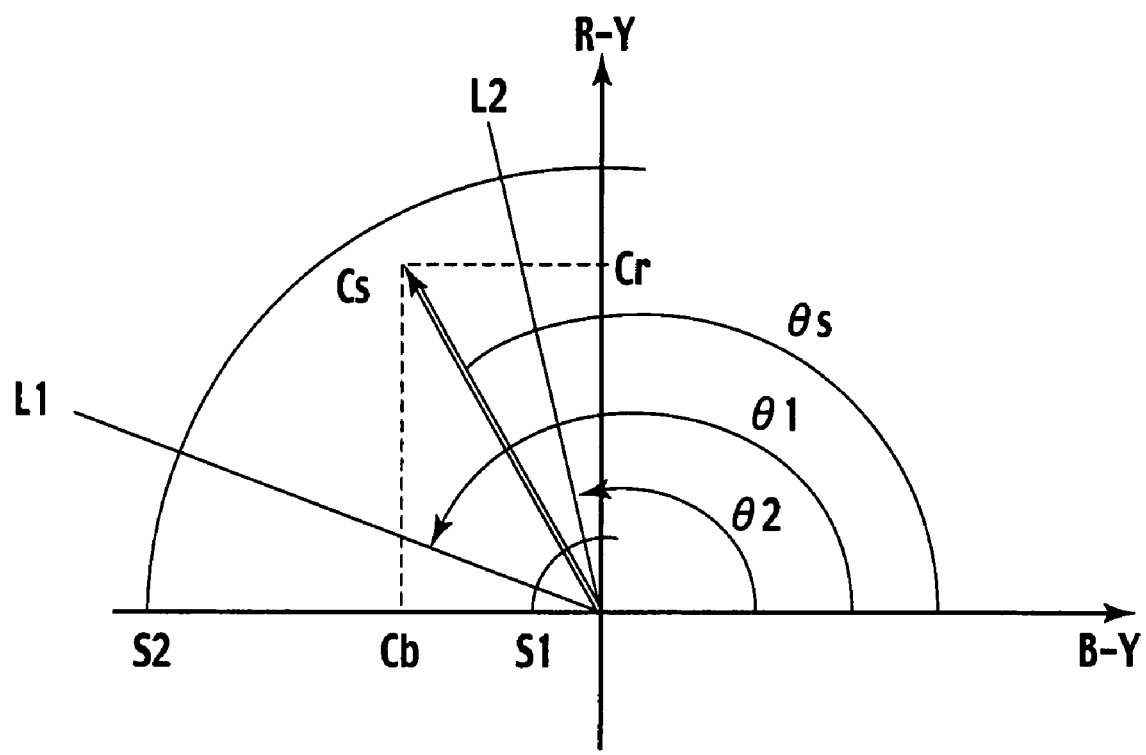
FIG. 8 is a view explaining the hue and saturation degree of an object extracted by the object extractor of FIG. 7.

The color filter 71 shown in FIG. 7 will be explained with reference to FIG. 8 that shows a color difference plane with an ordinate being an R−Y axis and an abscissa being a B−Y axis. Every color signal in television signals is expressible with a vector on the coordinate system of FIG. 8 and can be evaluated from polar coordinates. The color filter 71 limits the hue and color depth (degree of saturation) of a color signal consisting of color difference signals. In FIG. 8, a hue is expressed with a left-turn angle with the B−Y axis in the first quadrant serving as a reference (zero degrees). The degree of saturation is the scalar quantity of a vector. The origin of the color difference plane has a saturation degree of 0 with no color. The degree of saturation increases as it separates away from the origin, to increase the depth of color.

In FIG. 8, the color filter 71 passes a hue that falls in a range smaller than an angle of θ1 that defines an equal hue line L1 and larger than an angle of θ2 that defines an equal hue line L2. Also, the color filter 71 passes a color depth that falls in a range larger than an equal saturation degree line S1 and smaller than an equal saturation degree line S2. This range in the second quadrant corresponds to a skin-color range, i.e., the color of a human hand to be extracted according to this embodiment. This color range to be extracted, however, does not limit the present invention. The color filter 71 calculates an angle and a saturation degree according to color difference signals (R−Y, B−Y) from the video camera 2 and determines whether or not the color difference signals are within the range surrounded by the equal hue lines L1 and L2 and equal saturation degree lines S1 and S2.

Figure 9:
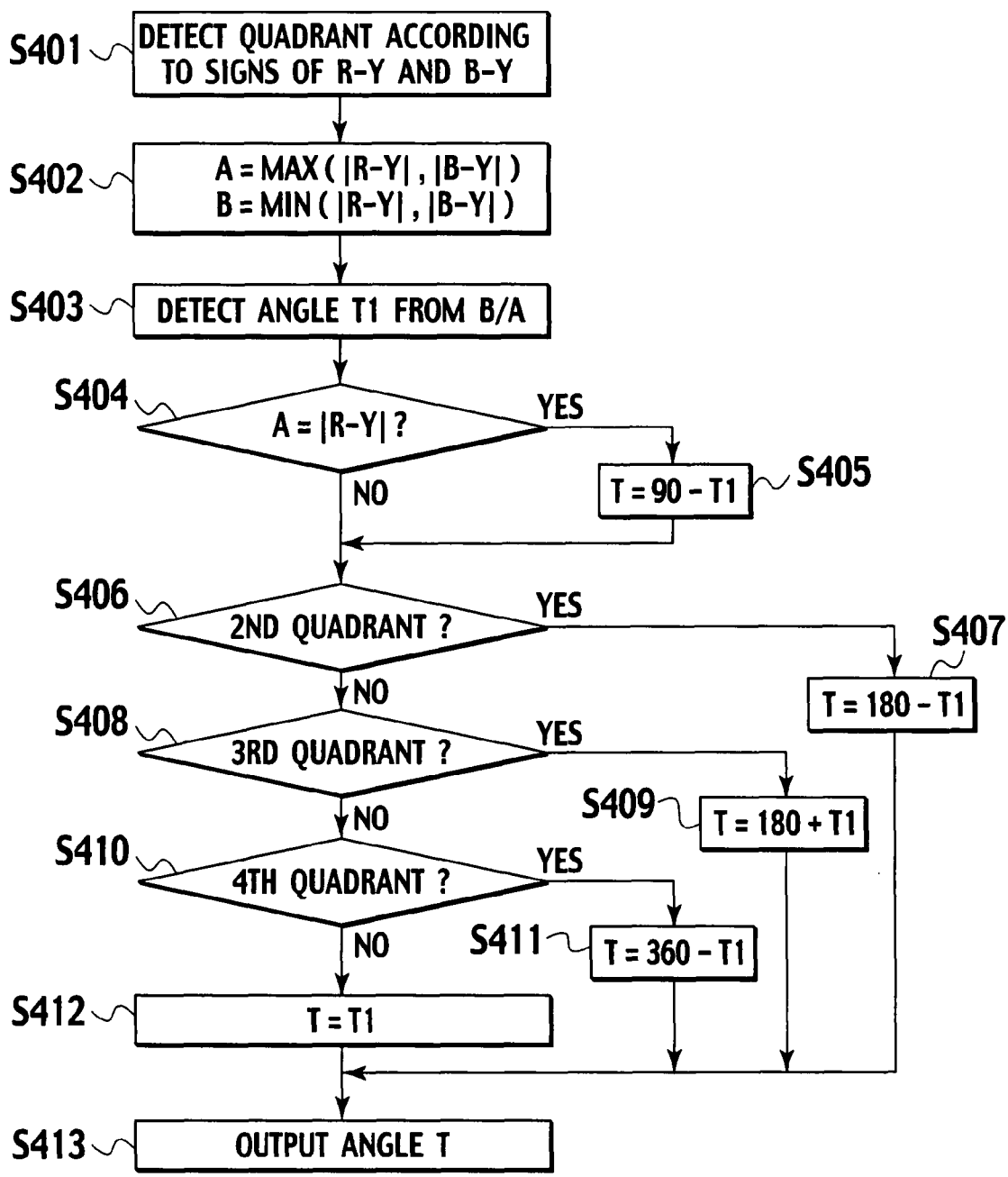
FIG. 9 is a flowchart showing a process of calculating a hue according to color difference signals.

An example of angle calculation is shown in FIG. 9. Steps shown in FIG. 9 calculate, for each input pixel, an angle formed in the color difference plane of FIG. 8. The angle calculation steps shown in FIG. 9 may be realized by software or hardware. According to this embodiment, the steps of FIG. 9 are realized by hardware.

In FIG. 9, step S401 refers to the signs of color difference signals R−Y and B−Y of each input pixel and detects a quadrant in the color difference plane where the hue of the input pixel is present. Step S402 defines a larger one of the absolute values |R−Y| and |B−Y| of the color difference signals R−Y and B−Y as A and a smaller one thereof as B.

Step S403 detects an angle T1 from B/A. As is apparent in step S402, the angle T1 is within the range of 0° to 45°. The angle T1 is calculable from a broken line approximation or a ROM table.

Step S404 determines whether or not A is equal to |R−Y|, i.e., whether or not |R−Y|>|B−Y|. If |R−Y|>|B−Y| is not true, step S406 is carried out. If |R−Y|>|B−Y| is true, step S405 replaces the angle T1 with (90−T1). Then, $\tan^{-1}((R-Y)/(B-Y))$ is calculated.

The reason why step S403 sets the range of 0° to 45° for detecting the angle T1 is because the inclination of the curve $\tan^{-1}((R-Y)/(B-Y))$ sharply increases to such an extent that is improper for the angle calculation.

Step S406 employs the quadrant data detected in step S401 and determines if it is the second quadrant. If it is the second quadrant, step S407 sets T=180−T1. If it is not the second quadrant, step S408 determines whether or not it is the third quadrant. If it is the third quadrant, step S409 sets T=180+T1.

If it is not the third quadrant, step S410 checks to see if it is the fourth quadrant. If it is the fourth quadrant, step S411 sets T=360−T1. If it is not the fourth quadrant, i.e., if it is the first quadrant, step S412 sets T=T1. At the end, step S413 outputs, for the pixel, the angle T in the color difference plane of FIG. 8.

With the steps mentioned above, an angle of the input color difference signals R−Y and B−Y in the color difference plane is found in the range of 0° to 360°. Steps S404 to S412 correct the angle T1 detected in step S403 to an angle T. Steps S404 to S411 correct the angle T1 according to a proper one of the first to fourth quadrants.

A color depth or a saturation degree Vc is calculated as follows:

$$Vc = \operatorname{sqrt}(Cr \times Cr + Cb \times Cb)$$

where Vc is a scalar quantity of a vector to indicate a saturation degree, Cr is an R−Y axis component of the color signal as shown in FIG. 8, Cb is a B−Y axis component as shown in FIG. 8, and "sqrt( )" is an operator to calculate a square root.

This process may be carried out by software or hardware. The multiplication and square root operations are difficult to realize by hardware and involve a large number of steps if realized by software. Accordingly, the above-mentioned process may be approximated as follows:

$$Vc = \max(|Cr|, |Cb|) + 0.4 \times \min(|Cr|, |Cb|)$$

where max (|Cr|, |Cb|) is an operation to select a larger one of |Cr| and |Cb| and min(|Cr|, |Cb|) is an operation to select a smaller one of |Cr| and |Cb|.

Thereafter, it is evaluated whether or not the angle (hue) T and saturation degree Vc are within the range of equal hue line angles θ1 and θ2 and within the range of equal saturation angle (color depth) lines S1 and S2. The color filter 71 of FIG. 7 passes any signal that is within these ranges.

Figure 10:
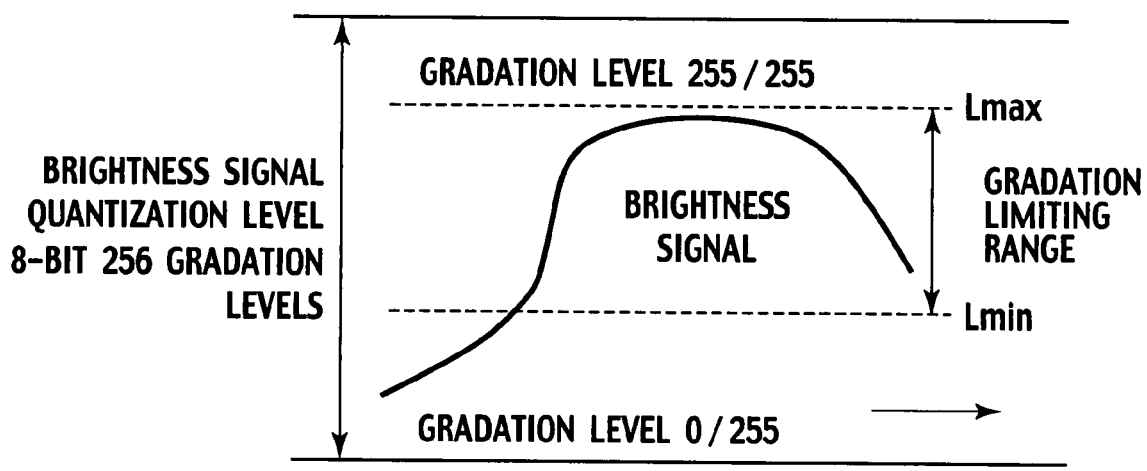
FIG. 10 is a view showing a brightness signal level of an object extracted by the object extractor of FIG. 7.

The gradation limiter 72 of FIG. 7 is to pass a brightness signal having specific gradation levels as shown in FIG. 10. In the case of an 8-bit digital signal, there are 256 gradation levels ranging from 0 to 255. To limit a range of gradation levels, a maximum level Lmax and a minimum level Lmin are set to pass a brightness signal whose gradation level is within this range.

FIG. 11 is a block diagram showing an example of the temporal difference filter 75 of FIG. 7 according to an embodiment of the present invention.

The temporal difference filter 75 includes a temporal difference extractor 750 and a motion detector 751. The temporal difference extractor 750 includes a detection zone image memory 80, a first subtracter 81, a first absolute value unit 82, a first nonlinear processor 83, and a write pulse generator 90. The motion detector 751 includes a peripheral zone image memory 84, a second subtracter 85, a second absolute value unit 86, a second nonlinear processor 87, a timing gate 88, and a motion quantity calculator 89. The temporal difference extractor 750 extracts the area of a hand in a detection zone, as will be explained later. The motion detector 751 detects a motion of the hand in a peripheral detection zone, as will be explained later.

The CPU 18 is connected to a CPU bus through which the CPU 18 receives information from the detection unit 17 and the like and processes the received information with the use of software. The CPU 18 includes a temporal difference filter controller 18F to control the temporal difference filter 75.

Figure 12A:
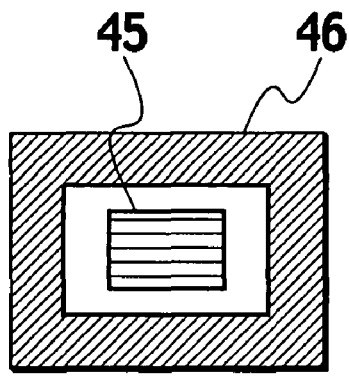
FIGS. 12A to 12D are views explaining a detection zone and a peripheral detection zone.
Figure 12B:
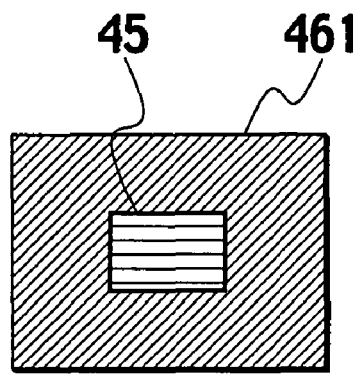

According to the embodiment, each of the detections zones 2-1 to 2-8 is surrounded by a peripheral detection zone. FIGS. 12A and 12B show examples of the peripheral detection zones. Anyone of the detection zones 2-1 to 2-8 corresponding to the push buttons 1-1 to 1-8 is hereinafter referred to as "detection zone 45" and a peripheral detection zone defined around the detection zone 45 as "peripheral detection zone 46."

In FIG. 12A, the peripheral detection zone 46 has an inner circumference that is larger than an outer circumference of the detection zone 45. Namely, the detection zone 45 is present on the inner side of the inner circumference of the peripheral detection zone 46. The inner circumference of the peripheral detection zone 46 may be equal to the outer circumference of the detection zone 45. In FIG. 12B, the detection zone 45 overlaps the peripheral detection zone 461. Each of the examples shown in FIGS. 12A and 12B is appropriate for the present invention. According to an embodiment of the present invention, the inner circumference of the peripheral detection zone 46 is identical to the outer circumference of the detection zone 45.

Figure 12C:
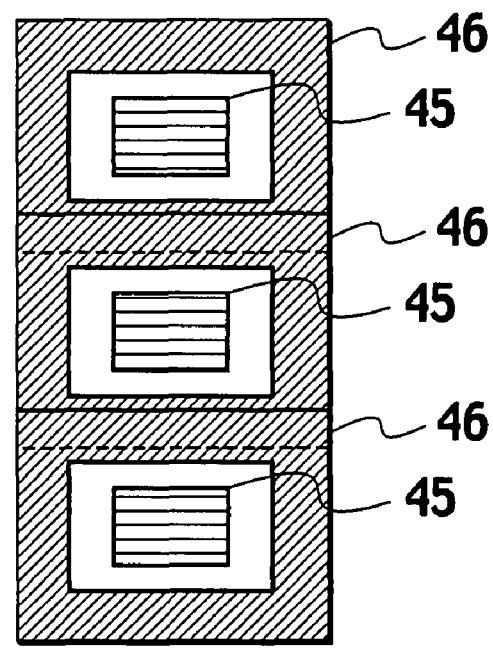
Figure 12D:
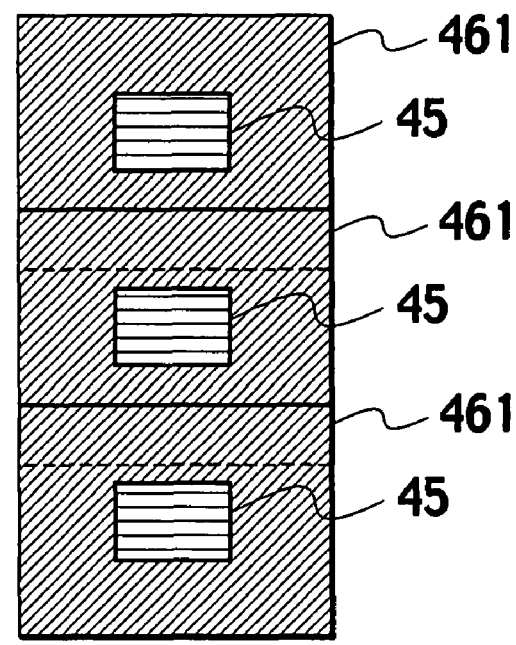

In FIG. 12C, adjacent peripheral detection zones 46 overlap each other, and in FIG. 12D, adjacent peripheral detection zones 461 overlap each other. Each of the examples can detect an object such as a hand that is present in one of the peripheral detection zones.

Returning to FIG. 11, the detection zone image memory 80 stores an image of the detection zone 45 of a corresponding push button from an image signal provided by the video camera 2. Namely, the memory 80 has a capacity equal to the size of the detection zone 45. The memory 80 is read frame by frame in response to a first read control signal. If a write operation to the memory 80 is stopped, the last-stored frame is continuously read out of the memory 80. As will be explained later in detail, the memory 80 is controlled so that the memory 80 may store an image of the detection zone 45 just before a hand is projected on the detection zone 45. Namely, the memory 80 is controlled to store only a background image of the detection zone 45 just before a hand is projected on the detection zone 45. The memory 80 is read frame by frame in a non-interlace method. In an interlace method, the memory 80 is read field by field at intervals of vertical periods.

Under control of the temporal difference filter controller 18F and based on a timing pulse provided by the timing pulse generator 12, the write pulse generator 90 generates a first write control signal to store an image of the detection zone 45 in the detection zone image memory 80. A first read control signal to read the memory 80 may be provided by the CPU 18 or a signal generator controlled by the CPU 18.

The first subtracter 81 finds a difference between an image signal of the detection zone 45 in a present frame and an image signal of the detection zone 45 of the preceding frame stored in the detection zone image memory 80. The image signal of the difference indicates the area of a hand in the detection zone 45. The sign of the subtraction is optional.

The first absolute unit 82 finds an absolute value of the difference provided by the first subtracter 81 and sends the absolute value to the first nonlinear processor 83. Based on the absolute difference value and input/output characteristics shown in FIG. 13, the first nonlinear processor 83 carries out a nonlinear operation to classify the image of the detection zone 45 into a hand-containing level or a noise-containing level. The first nonlinear processor 83 provides an output signal to the synthesizer 73.

Figure 13:
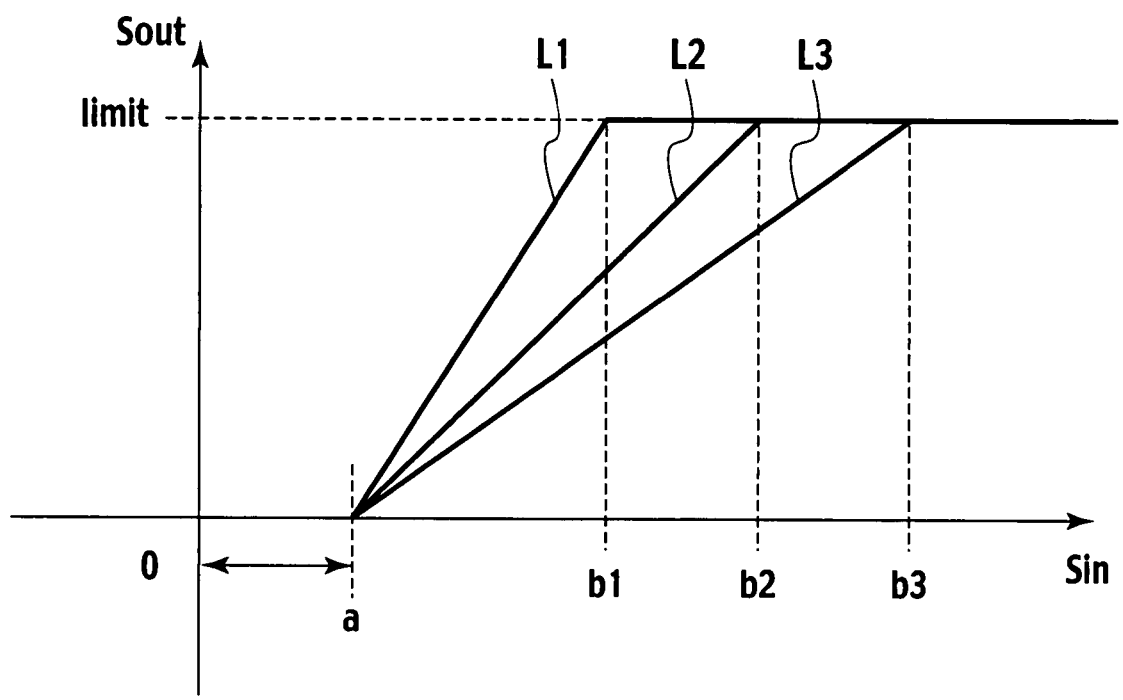
FIG. 13 is a view showing the input/output characteristics of a nonlinear processor in the temporal difference filter of FIG. 11.

In FIG. 13, an abscissa indicates an absolute difference value Sin provided by the first absolute unit 82 and an ordinate indicates an output signal Sout from the first nonlinear processor 83. If the absolute difference value Sin is in a low-level region of 0 to a, the value Sin is determined to be noise, and therefore, the output Sout will be 0.

If the absolute difference value Sin is in the range of a to b1, b2, or b3, the output signal Sout will be between 0 and a limit value according to lines L1, L2, or L3, where the line L1 reaches the limit value when the value Sin becomes b1, the line L2 reaches the limit value when the value Sin becomes b2, and the line L3 reaches the limit value when the value Sin becomes b3.

When the absolute difference value Sin exceeds a, the output signal Sout is generated. When the value Sin reaches the value b1, b2, or b3, the output signal Sout reaches the limit value. Thereafter, the output signal Sout keeps the limit value even if the value Sin exceeds the value b1, b2, or b3. The limit value is dependent on an output quantize number. The limit value may be a one-bit, two-value number with a=b, or a 5-bit number ranging from 0 to 31. In this way, the limit value is optional. If the output Sout from the first nonlinear processor 83 is a one-bit, two-value number, the first nonlinear processor 83 may be a comparator. The first nonlinear processor 83 may include a comparator.

The peripheral zone image memory 84 stores an image of the peripheral detection zone 46 set around the detection zone 45. The memory 84 according to this embodiment is a frame memory that writes and reads an image of the peripheral detection zone 46 frame by frame according to a second write control signal and second read control signal. The memory 84 may have a capacity of storing a single frame, or a plurality of frames. The second write control signal and second read control signal may be provided by the CPU 18 or a signal generator controlled by the CPU 18.

The second subtracter 85 finds a difference between an image signal of the peripheral detection zone 46 in a present frame and the image signal of the peripheral detection zone 46 in the preceding frame stored in the peripheral zone image memory 84. The image signal of the difference indicates the area of a hand in the peripheral detection zone 46. The sign of the subtraction is optional.

The second absolute unit 86 and second nonlinear processor 87 function like the first absolute unit 82 and first nonlinear processor 83. The input/output characteristics of the second nonlinear processor 87 are the same as those shown in FIG. 13.

The timing gate 88 receives output data from the second nonlinear processor 87 and a timing pulse from the timing pulse generator 12 shown in FIG. 2. The timing gate 88 passes the output data from the second nonlinear processor 87 representing the peripheral detection zone 46.

The motion quantity calculator 89 receives output data from the timing gate 88 and counts the number of data pieces or pixels each having a predetermined value or above. The count indicates the number of pixels in the area of a hand in the peripheral detection zone 46 and is hereinafter referred to as "peripheral quantity." The motion quantity calculator 89 may count data pieces each having a value greater than 0, or data pieces each having a predetermined value or above.

According to this embodiment, the motion quantity calculator 89 counts data pieces or pixels each having a value greater than 0. The peripheral quantity is equal to the number of pixels each showing a difference between the present and preceding images of the peripheral detection zone 46 and corresponds to the area of a hand (object) in the peripheral detection zone 46. The peripheral quantity may be a ratio of the number of pixels each involving a difference to the total number of pixels of the peripheral detection zone 46. The peripheral quantity may be an optional value representing the degree of difference occurred in the peripheral detection zone 46.

The peripheral quantity provided by the motion quantity calculator 89 is supplied through the CPU bus to the temporal difference filter controller 18F and is processed by software.

In this way, the temporal difference filter 75 stores an image of the peripheral detection zone 46 in the peripheral zone image memory 84, finds a difference between the present and previous images of the peripheral detection zone 46, calculates according to the difference a peripheral quantity indicative of the size of a hand area in the peripheral detection zone 46, and supplies the peripheral quantity to the temporal difference filter controller 18F. According to the peripheral quantity, the temporal difference filter controller 18F controls the write pulse generator 90 to write/read the detection zone image memory 80.

Figure 14:
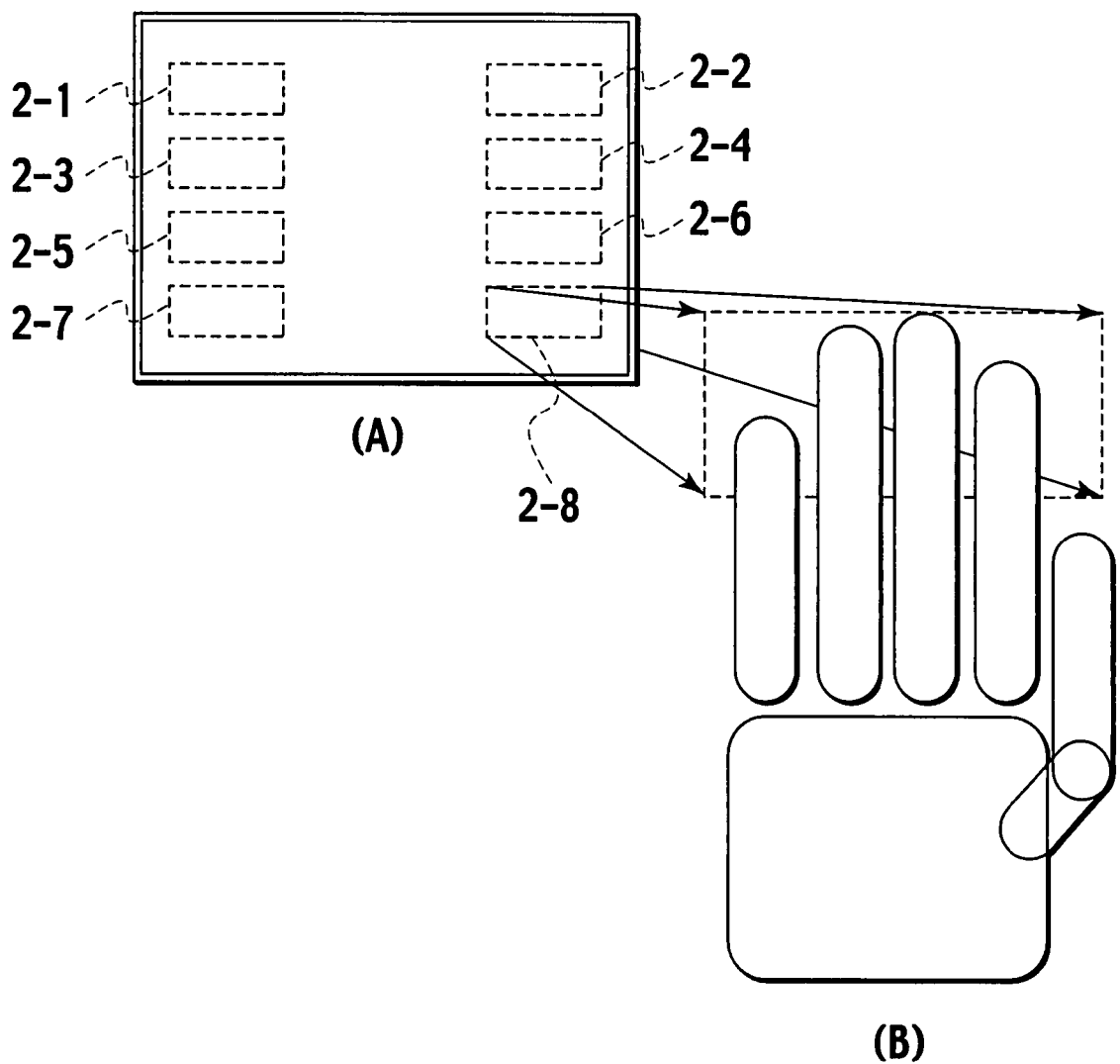
FIG. 14 is a view showing a hand projected on one of control buttons displayed on a display.
Figure 15:
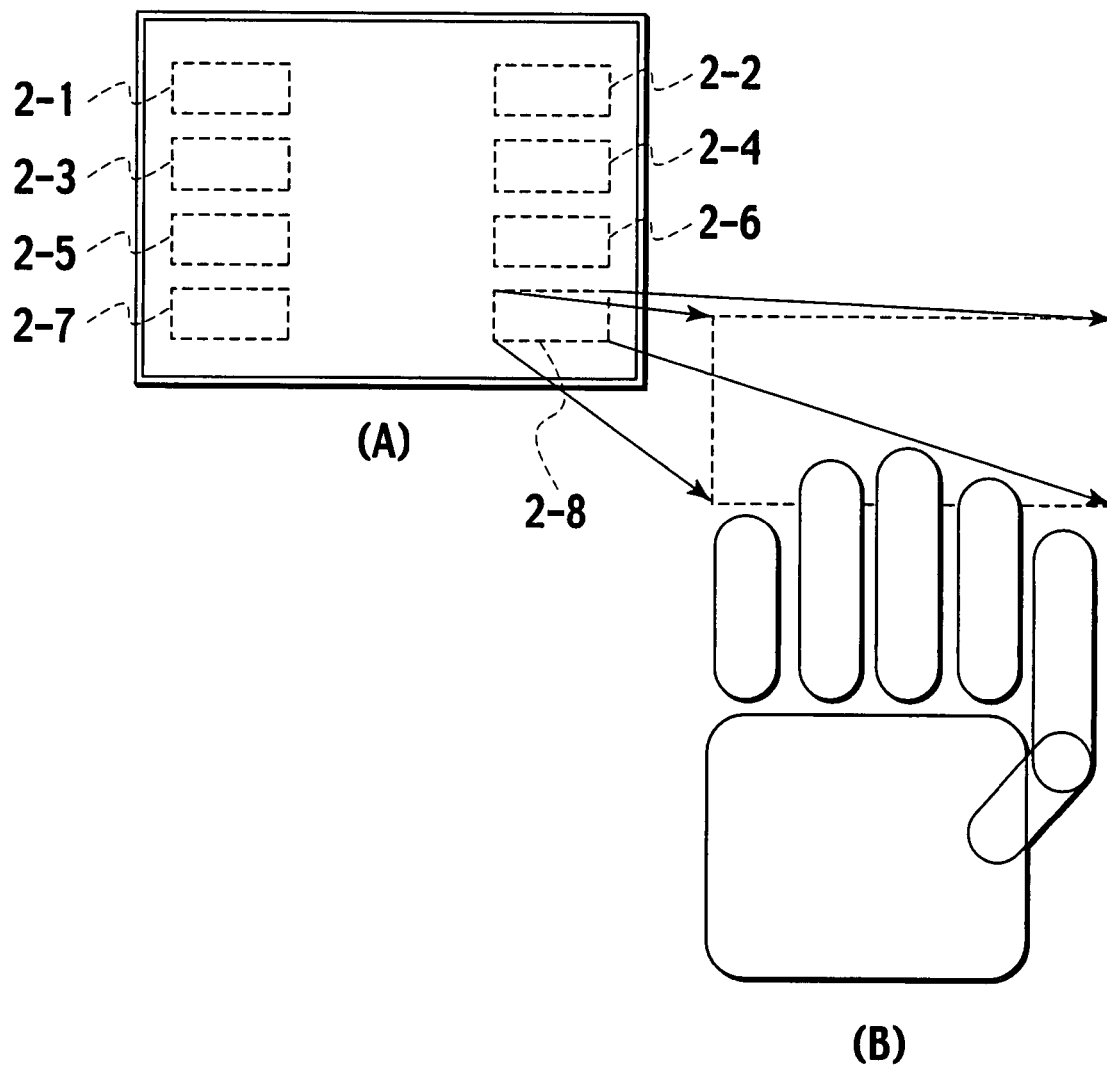
FIG. 15 is a view showing the hand of FIG. 14 with bent fingers.

Pictures (A) in FIGS. 14 and 15 show images from the video camera 2 on which the detection zones 2-1 to 2-8 are defined as indicated with dotted frames. As explained above, the user 3 moves his or her hand with respect to the detection zones 2-1 to 2-8 corresponding to the push buttons 1-1 to 1-8 displayed on the display 21, and the electronic appliance according to the present invention obtains control information from the hand motion.

Pictures (B) in FIGS. 14 and 15 show motions of the hand of the user 3. The picture (B) of FIG. 14 shows the hand with the fingers stretched to cover the detection zone 2-8 corresponding to the push button 1-8. The picture (B) of FIG. 15 shows the hand with the fingers bent. According to an embodiment of the present invention, bending fingers twice on a push button makes the CPU 18 recognize that the push button has been pushed (operated). Then, the CPU 18 outputs a control signal corresponding to the operated push button 1-8, to carry out a corresponding operation with respect to the electronic appliance. A pushing action on any one of the push buttons 1-1 to 1-8 may be accomplished only by projecting the hand onto the push button, or by bending the fingers once, thrice, or more, or by conducting any other action.

Figure 16A:
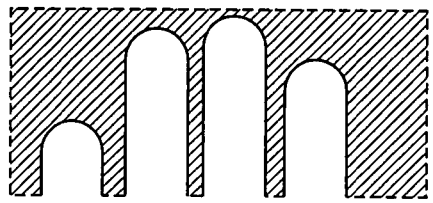
FIGS. 16A and 16B are views showing images formed from output signals from the object extractor of FIG. 7.
Figure 16B:
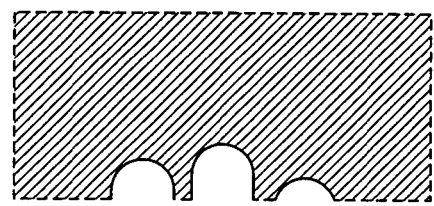

FIGS. 16A and 16B show images formed from signals provided by the object extractor 30 shown in FIG. 7 and correspond to FIGS. 14 and 15, respectively. Namely, the image of FIG. 16A is obtained when the fingers on the detection zone 2-8 are stretched as shown in the picture (B) of FIG. 14, and the image of FIG. 16B is obtained when the fingers on the detection zone 2-8 are bent as shown in the picture (B) of FIG. 15.

In this way, in the object extractor 30 of FIG. 7, the color filter 71 passes a part having a specific color (hand skin color in this embodiment), the gradation limiter 72 passes apart in a limited gradation range, and the temporal difference filter 75 passes a hand area separated from a background.

The object gate 74 of FIG. 7 blackens the detection zone 45 by zeroing the brightness and color difference signals except the parts passed through the filters 71, 72, and 75. Namely, the object gate 74 provides the images shown in FIGS. 16A and 16B each having a black background (hatched area) except the hand area. Blackening an entire area except the skin-color area improves a detection accuracy in the feature detector 32 that is arranged after the object gate 74. The background level used by the object gate 74 is not limited to black. It may be set to an optimum level depending on an object to be detected.

An output signal from the object gate 74 is supplied to the timing gate 31 of FIG. 6. The timing gate 31 passes the area of a corresponding one of the push buttons 1-1 to 1-8 and negates the remaining parts.

Figure 17:
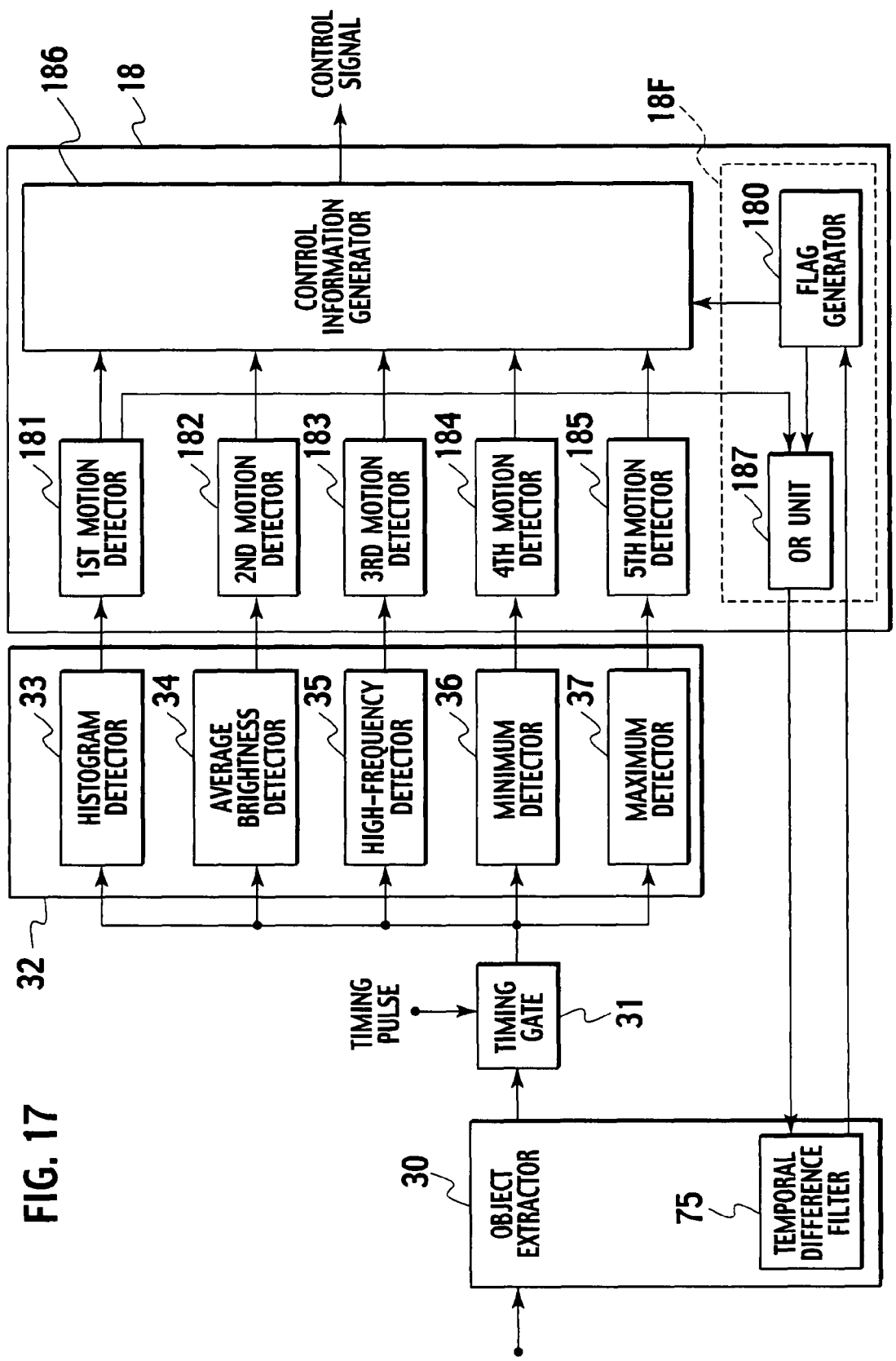
FIG. 17 is a block diagram showing the details of a control information determination unit (CPU) shown in FIG. 2 and the detector shown in FIG. 6.

FIG. 17 shows the details of the feature detector 32. The feature detector 32 includes functional blocks to detect various characteristics from an image signal indicative of the area of an item shown in FIGS. 16A and 16B and generate detection signals. According to an embodiment of the present invention, the feature detector 32 includes a histogram detector 33, an average brightness (average picture level (APL)) detector 34, a high-frequency detector 35, a minimum detector 36, and a maximum detector 37. An image has various characteristics. According to an embodiment of the present invention, detection signals generated by the detectors 33 to 37 are used by first to fifth motion detectors 181 to 185 of the CPU 18, to identify a hand and recognize a motion of the hand.

Detection signals from the detectors 33 to 37 of the feature detector 32 are supplied to the first to fifth motion detectors 181 to 185, respectively, to detect a finger bending motion. If a finger bending motion is detected, a control information generator 186 in the CPU 18 identifies a control operation assigned to the push button (one of the push buttons 1-1 to 1-8) on which the finger bending motion has been executed and outputs a control signal to carry out the control operation on the television set 1.

The detectors 33 to 37 in the feature detector 32 are formed by hardware according to an embodiment of the present invention. These detectors provide data (detection signals) representative of features in the corresponding detection zone (one of the detection zones 2-1 to 2-8) field by field or frame by frame, i.e., every vertical period to the CPU 18 through the CPU bus.

The histogram detector 33 generates a detection signal according to the image signal that indicates the area of the hand and is obtained by using the output signal from the first subtracter 81. Specifically, the histogram detector 33 separates the gradation levels of a brightness signal provided by the timing gate 31 into, for example, eight stepwise groups (gradation levels 0 to 7), counts the number of pixels belonging to each group, and provides the first motion detector 181 with data indicative of a histogram per field or frame. The average brightness detector 34 adds up gradation levels of each field or frame, divides the sum by the number of pixels, and provides the second motion detector 182 with the average brightness level of the field or frame.

The high-frequency detector 35 employs a spatial filter (two-dimensional filter) to extract high-frequency components and provides the third motion detector 183 with the quantity of the high-frequency components per field or frame. The minimum detector 36, provides the fourth motion detector 184 with a minimum gradation level of the brightness signal of the field or frame. The maximum detector 37 provides the fifth motion detector 185 with a maximum gradation level of the brightness signal of the field or frame.

Figure 18A:
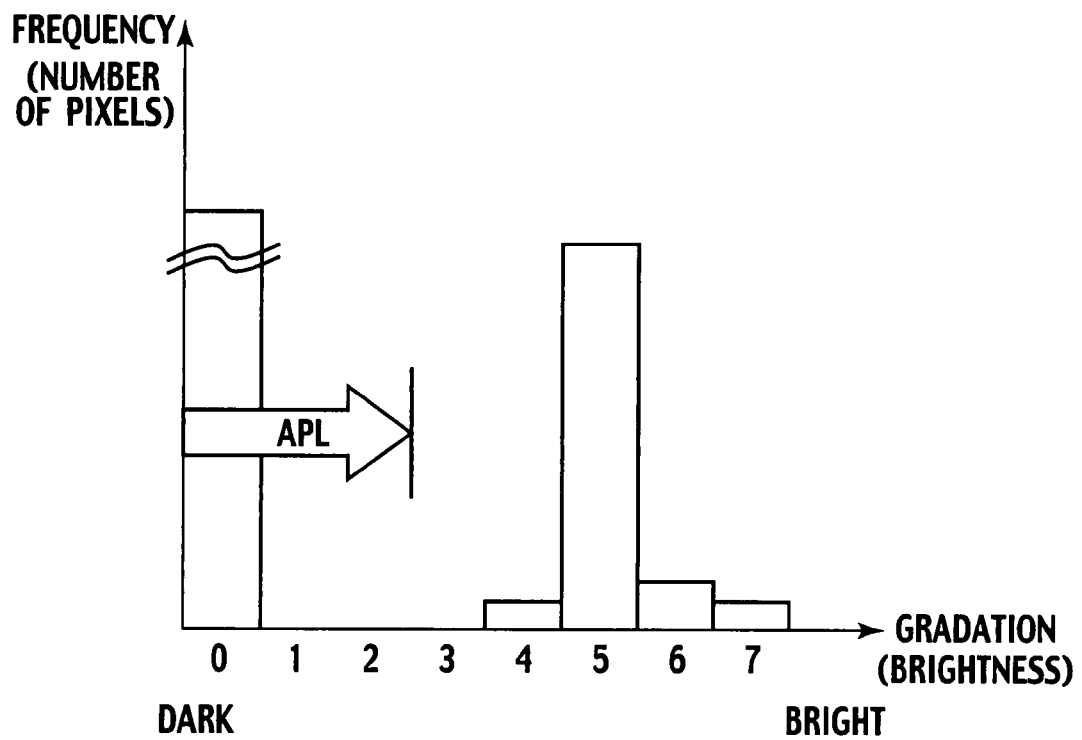
FIGS. 18A and 18B are graphs showing brightness frequency distributions and average picture levels (APLs) corresponding to the states shown in FIGS. 16A and 16B.

There are several methods to determine the state of a hand or fingers according to the histogram data. For example, a hand motion can be determined according to the numbers of pixels classified into gradation levels 4 to 7. FIG. 18A shows histogram data corresponding to the bent fingers shown in FIG. 16A, and FIG. 18B shows histogram data corresponding to the stretched fingers shown in FIG. 16B.

Figure 18B:
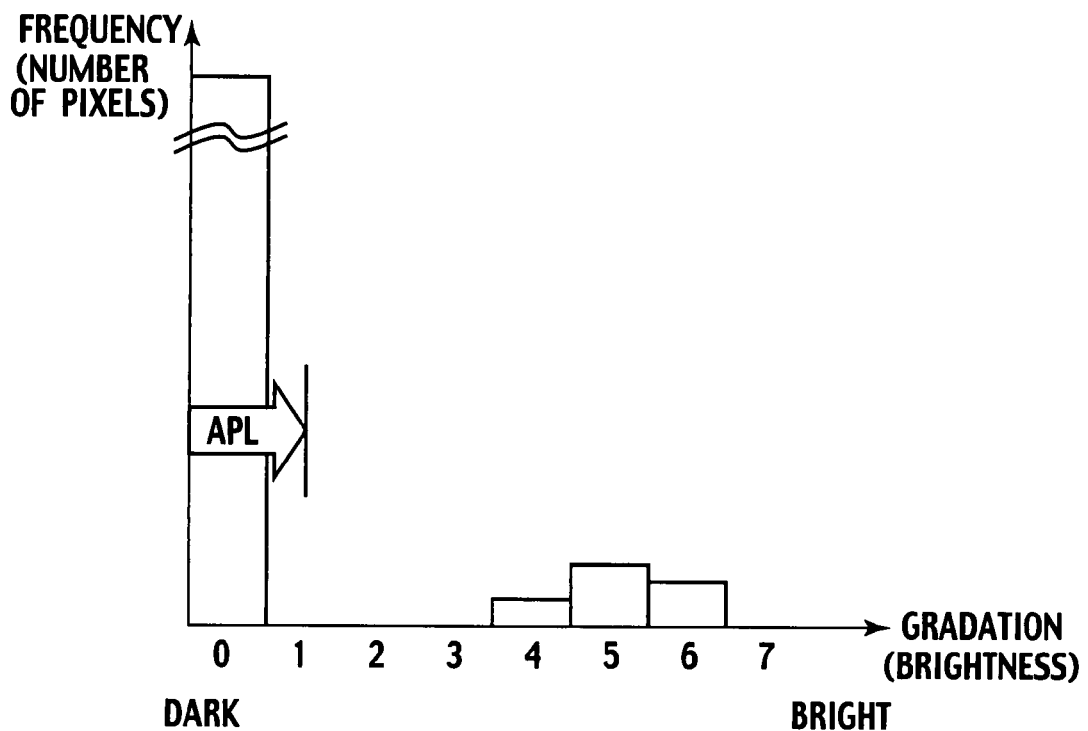

It is understood from comparison between FIGS. 18A and 18B that the finger-stretched state is distinguishable from the finger-bent state by examining the numbers of pixels having a gradation level of 0, i.e., a black level of each state. This is because the number of black pixels contained in an output signal of the object extractor 30 differs between the finger-stretched state and the finger-bent state. Accordingly, it is possible to determine a hand motion according to the number of pixels classified into the gradation level of 0. Determining a hand motion according to only the number of pixels having the gradation level of 0 is advantageous in simplifying the state determination process carried out in the CPU 18.

The first to fifth motion detectors 181 to 185 store the data received from the feature detector 32 as variables and process the variables by software to find a hand motion.

It is preferable that the feature detector 32 includes all of the detectors 33 to 37. It is possible, however, that the feature detector 32 includes only the histogram detector 33 because the histogram detector 33 alone can recognize a hand motion.

Output data from the first to fifth motion detectors 181 to 185 are supplied to the control information generator 186. The first motion detector 181 provides an OR unit 187 with a second detection flag.

Based on the data from the first to fifth motion detectors 181 to 185, the control information generator 186 generates a control signal to execute an operation of the electronic appliance assigned to the pushed one of the push buttons 1-1 to 1-8. As will be explained later, there is an opportunity that the output of the control information generator 186 is disabled by a flag generator 180.

The flag generator 180 generates various flags according to data provided by the temporal difference filter 75 and supplies the flags to the control information generator 186 and OR unit 187. The OR unit 187 generates a flag to stop writing to the detection zone image memory 80 according to flags supplied from the first motion detector 181 and flag generator 180 and supplies the generated flag to the temporal difference filter 75. The flag generator 180 and OR unit 187 are included in the temporal difference filter controller 18F.

FIG. 19 shows an algorithm according to an embodiment of the present invention to control the temporal difference filter 75 and control information generator 186 according to data provided by the temporal difference filter 75. An abscissa (time axis) in each of graphs (A) to (F) of FIG. 19 has the same scale and is expressed in units of frames.

In the graph (A) of FIG. 19, an ordinate indicates the peripheral quantity calculated by the motion quantity calculator 89 according to a hand detected in the peripheral detection zone 46 and an abscissa indicates elapsed time based on frames.

Thresholds th1 and th2 shown on the ordinate of the graph (A) of FIG. 19 will be explained with reference to FIGS. 20A and 20B.

Figure 20A:
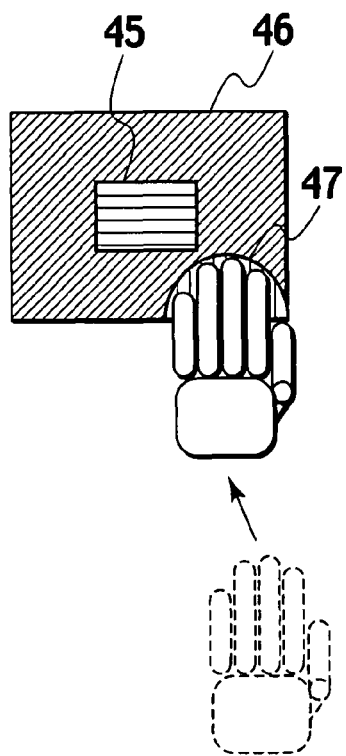
FIGS. 20A and 20B are views showing a hand projected in the vicinity of a control button displayed on a display.
Figure 20B:
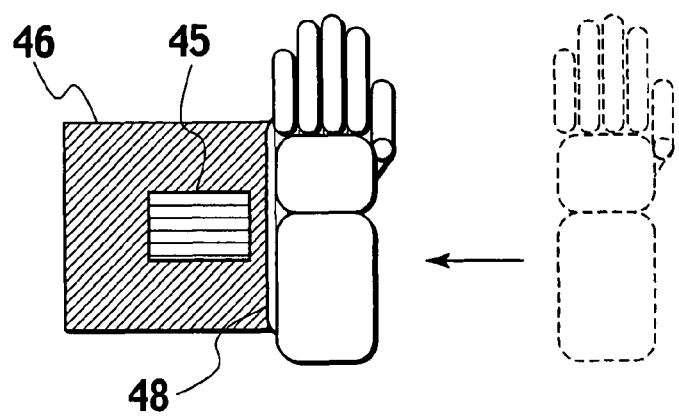

FIGS. 20A and 20B show a hand projected on the peripheral detection zone 46. In FIG. 20A, the hand is in the peripheral detection zone 46 and is moving toward the detection zone 45 with an intention of controlling the push button in the detection zone 45. In FIG. 20B, the hand is in the peripheral detection zone 46 and is only moving in left and right directions with no intention of manipulating any push button.

In FIG. 20A, an area 47 roughly indicates the peripheral quantity calculated from a difference caused by the hand in the peripheral detection zone 46. Similarly, in FIG. 20B, an area 48 roughly indicates the peripheral quantity calculated from a difference caused by the hand in the peripheral detection zone 46. As is apparent from comparison between FIGS. 20A and 20B, the area 48 created when there is no intention of putting the hand on a specific push button is larger than the area 47 created when there is an intention of putting the hand on a specific push button. Namely, there is a difference in the peripheral quantity between the states of FIGS. 20A and 20B.

Accordingly, this embodiment examines the peripheral quantity to estimate a hand motion before the hand on the peripheral detection zone 46 moves to the detection zone 45 and control the temporal difference filter 75 and control information generator 186 according to the estimate. The threshold th1 is to detect an intention of moving the hand onto a push button as shown in FIG. 20A and the threshold th2 is to detect an intention of not moving the hand onto a specific push button as shown in FIG. 20B.

If the peripheral quantity is below the threshold th1 in the graph (A) of FIG. 19, the temporal difference filter controller 18F provides through the write pulse generator 90 an instruction to write an image of the detection zone 45 into the detection zone image memory 80.

In each of periods from t1 to t5, from t7 to t8, and from t13 to t16, the peripheral quantity provided by the motion detector 751 of the temporal difference filter 75 indicates that the hand is entering the peripheral detection zone 46, and the flag generator 180 acknowledges the fact.

At t1, the peripheral quantity exceeds the threshold th1 and it is checked to see if a period P1 in which the peripheral quantity is below the threshold th1 is present before t1. The period P1 is a period in which the flag generator 180 determines that the hand is not in the peripheral detection zone 46. If it is determined that the period P1 is secured before t1, the flag generator 180 sets a first detection flag when a period P2 passes after t1, as shown in the graph (B) of FIG. 19. Namely, the flag generator 180 provides the first detection flag a predetermined time (period P2) after a time point when the peripheral quantity exceeds the threshold th1. The first detection flag is supplied to the OR unit 187.

If the period P1 is not secured before t1, the peripheral quantity is ignored as noise even if the peripheral quantity exceeds the threshold th1. This embodiment is based on an assumption that the background of the hand is immobile, and therefore, the period P1 allows an image that involves little peripheral quantity to be stored in the detection zone image memory 80 as a background. It also enables a difference between the hand and the background to be correctly obtained when the hand enters the peripheral detection zone 46.

The first detection flag disappears a period P2 after t5 when the peripheral quantity in the peripheral detection zone 46 drops below the threshold th1 in the graph (A) of FIG. 19. The period P2 is set not to follow small variations occurring in the peripheral quantity around the threshold th1 and to secure resistance against noise. It is possible to provide hysteresis in the level (ordinate) direction.

If the peripheral quantity calculated by the motion quantity calculator 89 exceeds the threshold th2, the flag generator 180 generates a control prohibit flag shown in the graph (F) of FIG. 19 and supplies the control prohibit flag to the control information generator 186 so that the push buttons may not activate corresponding operations. In response to the control prohibit flag, the control information generator 186 prohibits the issuance of control signals and stops executing control operations corresponding to the control buttons.

The graph (C) of FIG. 19 indicates the number of pixels contained in the area of a hand detected in the detection zone 45. This number of pixels found in the detection zone 45 is hereinafter referred to as "central quantity" in contrast to the peripheral quantity. The central quantity corresponds to the number of pixels involving differences between the present and preceding images of the detection zone 45 and is calculated by the first motion detector 181. The first motion detector 181 according to an embodiment of the present invention receives histogram data (detection signal) for each frame or field from the histogram detector 33 and calculates the central quantity indicative of a hand area in the detection zone 45. More precisely, the first motion detector 181 totals pixels other than those having a gradation level of 0 of a given histogram (e.g. anyone of FIGS. 18A and 18B) and provides the central quantity as shown in the graph (C) of FIG. 19. Instead of using histogram data provided by the histogram detector 33, the central quantity may be calculated from an output signal of the first nonlinear processor 83 or an output signal of the object gate 74.

Between t9 and t14, the central quantity indicates the hand in the detection zone 45 twice conducting the finger bending motion of the picture (B) of FIG. 15. The peripheral quantity in the peripheral detection zone 46 shown in the graph (A) of FIG. 19 exceeds the threshold th1 in each of periods from t7 to t8 and t13 to t16. The period from t7 to t8 is a period in which the hand that is moving toward the detection zone 45 is detected in the peripheral detection zone 46. The period from t13 to t16 is a period in which a manipulation of the push button ends and no hand is detected in the detection zone 45 and after which no hand is detected in the peripheral detection zone 46.

A waveform indicated with a dotted line over t11 and t12 is a peripheral quantity to be detected in the peripheral detection zone 461 shown in FIG. 12B. A finger bending motion changes the peripheral quantity to be detected in the peripheral detection zone 461.

The first motion detector 181 generates a second detection flag shown in the graph (D) of FIG. 19 when the central quantity shown in the graph (C) of FIG. 19 exceeds a threshold th3. The second detection flag disappears a period P3 after t3 when the central quantity detected in the detection zone 45 drops below the threshold th3. The period P3 is set not to follow small variations occurring in the central quantity around the threshold th3. It is possible to provide hysteresis in the level direction.

The first motion detector 181 calculates the central quantity representing a hand area in the detection zone 45 and generates the second detection flag for each of periods from t2 to t4 and from t9 to t15 in which the central quantity exceeds the threshold th3. The second detection flag is supplied to the OR unit 187.

In FIG. 19, the graph (E) shows a write stop flag for the detection zone image memory 80. The write stop flag is made high by the OR unit 187 when an OR of the first detection flag shown in the graph (B) of FIG. 19 and the second detection flag shown in the graph (D) of FIG. 19 is high, i.e., if one of the first and second detection flags is high.

In FIGS. 11 and 17, the OR unit 187 provides the write pulse generator 90 with the write stop flag. If the write stop flag is low, the first write control signal writes a brightness signal into the detection zone image memory 80. If the write stop flag is high, the first write control signal stops writing a brightness signal into the memory 80, and the last frame data in the memory 80 is read. According to the first detection flag shown in the graph (B) of FIG. 19 and the second detection flag shown in the graph (D) of FIG. 19, the OR unit 187 generates the write stop flag to stop writing to the memory 80. The flag generator 180, first motion detector 181, and OR unit 187 function as a write controller that stops writing to the memory 80 according to the peripheral quantity.

The algorithm shown in FIG. 19 sets the threshold th1 to detect a hand in the peripheral detection zone 46 and stops writing to the detection zone image memory 80 just before the hand enters the detection zone 45, to store only a background image in the memory 80.

According to this embodiment, a background image can be stored in the detection zone image memory 80 even if a period is short between when a hand is detected in the peripheral detection zone 46 and when the hand enters the detection zone 45. As a result, the first subtracter 81 can correctly obtain a difference between the background and the hand in the detection zone 45. In addition, the central quantity shown in the graph (C) of FIG. 19 that represents a hand area in the detection zone 45 and is provided by the first motion detector 181 becomes more accurate to correctly extract only the hand as shown in FIGS. 16A and 16B. Namely, the embodiment can correctly extract an object and prevent an erroneous recognition of manipulation on the push buttons 1-1 to 1-8.

Figure 21A:
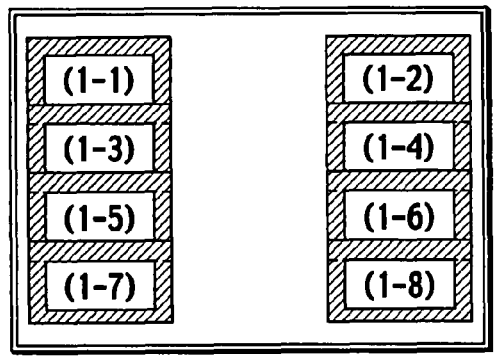
FIGS. 21A and 21B are views showing control buttons displayed on a display and a hand motion.
Figure 21B:
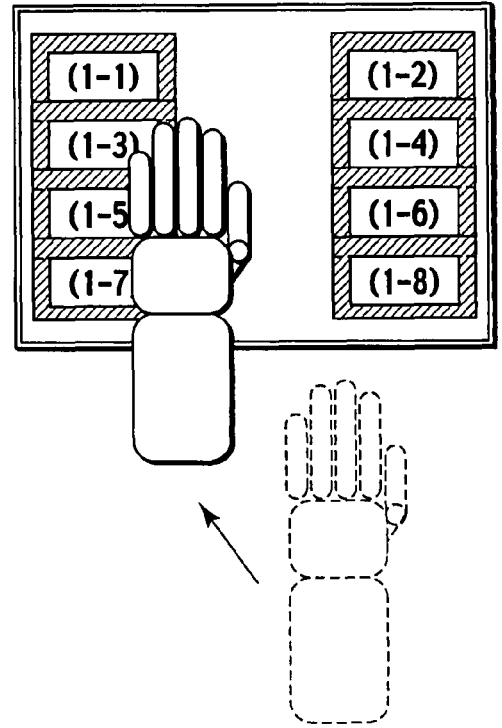

FIGS. 21A and 21B show the detection zones 45 and peripheral detection zones 46 displayed on the display 21, in which FIG. 21A shows no hand and FIG. 21B shows a hand.

In FIG. 21A, there is no hand over the detection zones 45 and peripheral detection zones 46 for the push buttons 1-1 to 1-8, and therefore, the write stop flag shown in the graph (E) of FIG. 19 is low for the first write control signal supplied to the detection zone image memory 80.

In FIG. 21B, the hand is upwardly moving onto the push button 1-3. When the hand is projected on the peripheral detection zone 46 around the push button 1-3, the write stop flag shown in the graph (E) of FIG. 19 becomes high to stop writing to the detection zone image memory 80 related to the detection zone 45 of the push button 1-3. At this time, the hand is also projected on the detection zones 45 and peripheral detection zones 46 of the push buttons 1-5 and 1-7, and therefore, writing to the detection zone image memories 80 for the detection zones 45 of the push buttons 1-5 and 1-7 is also stopped.

In this way, when a hand moving toward a specific push button enters a peripheral detection zone 46, a write pulse to the detection zone image memory 80 of the detection zone 45 related to the peripheral detection zone 46 in question is stopped by the write stop flag, so that a background image just before the hand enters the detection zone 45 is kept in the memory 80. When the hand becomes not detected in the detection zone 45 and peripheral detection zone 46, the write stop flag disappears to resume writing to the memory 80.

According to the above-mentioned embodiment, a brightness signal is written into the peripheral zone image memory 84 every frame. FIG. 22 shows another embodiment of the present invention that writes a brightness signal into the memory 84 every second frame.

In graph (A) of FIG. 22, an upper row shows frame numbers along a time axis with each frame corresponding to a vertical period. A lower row shows input signals provided with frame numbers (F1, F2, and the like). Graph (B) of FIG. 22 shows the second write control signal (FIG. 11) supplied to the peripheral zone image memory 84. The second write control signal is used to write an input signal (brightness signal) into the memory 84 every second frame.

Graph (C) of FIG. 22 shows the second read control signal (FIG. 11) supplied to the peripheral zone image memory 84. The second read control signal twice reads the same frame like F1, F1, F3, F3, F5, F5, and so on. This is because the second read control signal reads the memory 84 every frame and because writing to the memory 84 is carried out every second frame as shown in the graph (B) of FIG. 22.

Graph (D) of FIG. 22 shows the peripheral quantity provided by the motion quantity calculator 89 according to a difference between the input signal in the lower row of the graph (A) of FIG. 22 and the signal read in response to the second read control signal. The peripheral quantity is transferred frame by frame through the CPU bus to the temporal difference filter controller 18F and is processed by software according to the algorithm explained with reference to FIG. 19.

If the hand enters the peripheral detection zone 46 at a constant speed, the peripheral quantity based on a two-frame difference signal will be about twice as large as the peripheral quantity based on a one-frame difference signal.

As shown in the graph (B) of FIG. 22, the second write control signal writes the peripheral zone image memory 84 every second frame. As a result, a difference signal provided by the second subtracter 85 alternates a one-frame difference and a two-frame difference when providing the peripheral quantity. When using the one-frame difference, it may be doubled and averaged. Depending on situations, it is possible to use only the one-frame difference, or only the two-frame difference.

The peripheral zone image memory 84 may have a capacity of one frame and may be written every second frame. This technique can also provide the motion detector 751 with accuracy and correctness.

Instead of carrying out the above-mentioned intermittent operation at intervals of two frames, it is possible to carry out the same at intervals of three or more frames. However, the larger the number of frames in each interval, the slower the speed of detecting a hand. Namely, as the number of frames increases, it becomes more difficult to detect a hand that enters the peripheral detection zone 46 at high speed. Accordingly, it is practical to process data at intervals of two or three frames.

Figure 23:
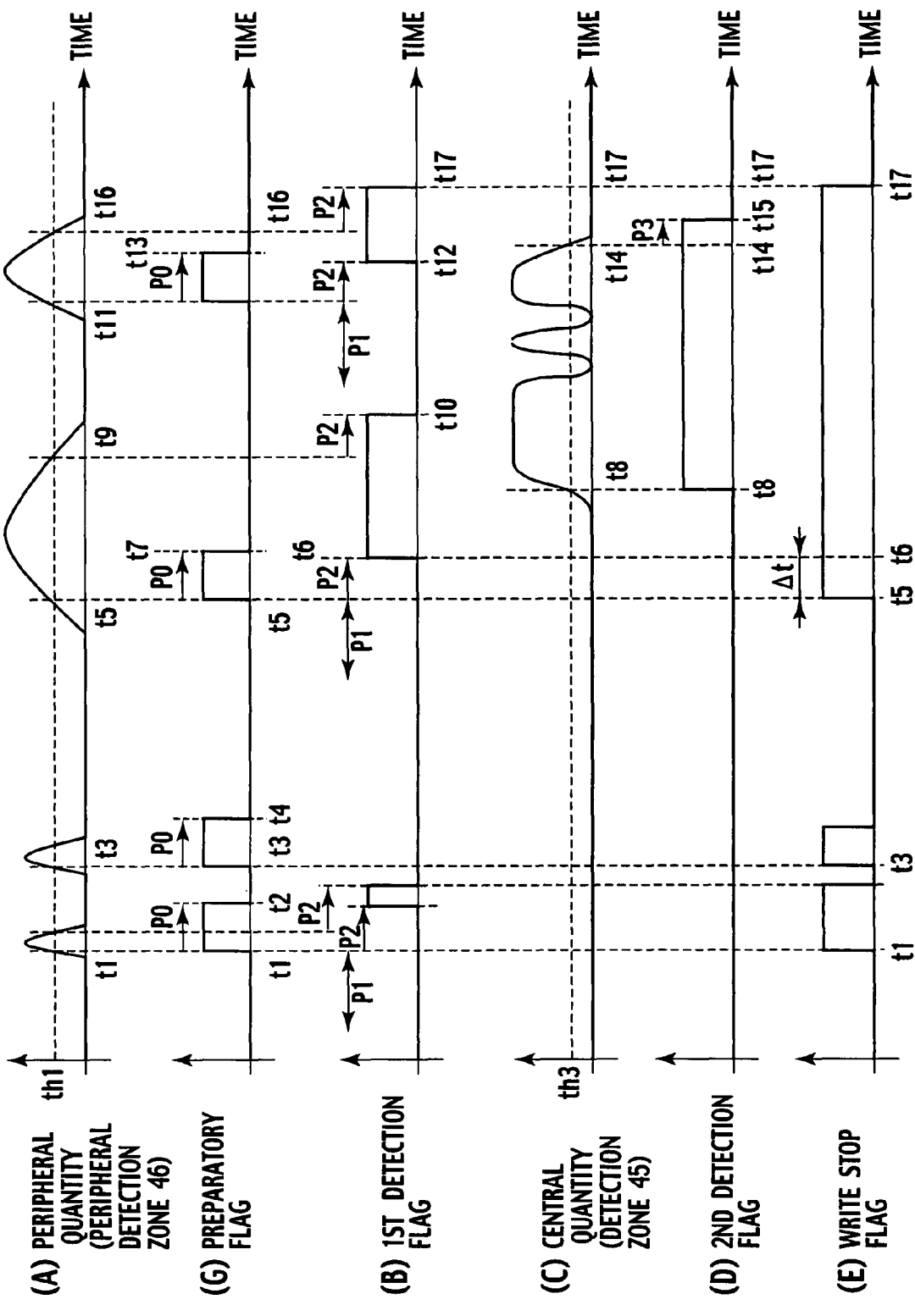
FIG. 23 is a view explaining operation of the temporal difference filter and control information determination unit (CPU) shown in FIG. 17 based on an algorithm according to an embodiment of the present invention.

FIG. 23 shows another algorithm to control the temporal difference filter 75 and control information generator 186 according to an embodiment of the present invention.

The peripheral quantity representing a hand area in the peripheral detection zone 46 includes unintended noise. To increase resistance against such noise, the peripheral quantity must be passed through a low-pass filter, or the resultant data passed through the low-pass filter must be accumulated not to react to spontaneous signals.

The first detection flag shown in the graph (B) of FIG. 19 rises after the period P2, and therefore, a hand that moves at high speed will enter the detection zone 45 before stopping writing to the detection zone image memory 80. If this happens, an image including the hand is written as a background image into the memory 80.

To cope with this problem, the algorithm of FIG. 23 controls writing to the detection zone image memory 80 quicker than the algorithm of FIG. 19 in response to the peripheral quantity representative of a hand area detected in the peripheral detection zone 46.

Graphs (A) to (E) and (G) shown in FIG. 23 have abscissas (time axes) of the same scale. Each time axis is based on units of frames and has time points t1 to t17. In addition to the algorithm of FIG. 19, the algorithm of FIG. 23 employs a preparatory pulse (flag). The graphs (A) to (D) of FIG. 23 are the same as the graphs (A) to (D) of FIG. 19 in principle. According to the peripheral quantity indicative of a hand area in the peripheral detection zone 46 shown in the graph (A) of FIG. 23, the first detection flag shown in the graph (B) of FIG. 23 rises. According to the central quantity indicative of a hand area in the detection zone 45 shown in the graph (C) of FIG. 23, the second detection flag shown in the graph (D) of FIG. 23 rises. The control prohibit flag shown in the graph (F) of FIG. 19 is omitted in FIG. 23.

The graph (G) of FIG. 23 shows the preparatory flag. The preparatory flag is generated by the flag generator 180 shown in FIG. 17. The flag generator 180 generates the preparatory flag for a period P0 once the peripheral quantity shown in the graph (A) of FIG. 23 exceeds the threshold th1. In the graph (G) of FIG. 23, the preparatory flag rises in each of periods from t1 to t2, from t3 to t4, from t5 to t7, and from t11 to t13. The preparatory flag reacts to a hand motion on the peripheral detection zone 46 with no intention of entering the detection zone 45, or to impulse noise.

The write stop flag shown in the graph (E) of FIG. 23 is generated by the OR unit 187 that ORs the preparatory flag shown in the graph (G) of FIG. 23, the first detection flag shown in the graph (B) of FIG. 23, and the second detection flag shown in the graph (D) of FIG. 23. When the preparatory flag is set based on the peripheral quantity detected in the peripheral detection zone 46 due to an unintended motion or noise, writing to the detection zone image memory 80 is stopped. Writing to the memory 80 resumes as soon as the period P0 passes.

Unlike the embodiment of FIG. 19 that raises the write stop flag at t6 in the graph (E) of FIG. 23, the embodiment of FIG. 23 raises the write stop flag at t5 as shown in the graph (E) of FIG. 23 due to the preparatory flag. Namely, the embodiment of FIG. 23 quickens a rise of the write stop flag by a period of Δt between t5 and t6, to effectively prevent an image including a hand being written as a background image into the detection zone image memory 80.

This advantage is realized by ORing the preparatory flag of the graph (G) of FIG. 23 that frequently rises because of a quick response without considering noise and the first detection flag of the graph (B) of FIG. 23 having noise resistance and by using the ORed result as a trigger of the write stop flag.

The preparatory flag is generated by software in the flag generator 180 in the CPU 18. Alternatively, the preparatory flag may be generated by hardware. It is possible to generate the preparatory flag by hardware according to the peripheral quantity provided by the motion quantity calculator 89, directly supply the flag to the write pulse generator 90, which ORs the same with the first detection flag shown in the graph (B) of FIG. 23 obtained by software and the second detection flag shown in the graph (D) of FIG. 23 obtained by software.

Figure 24:
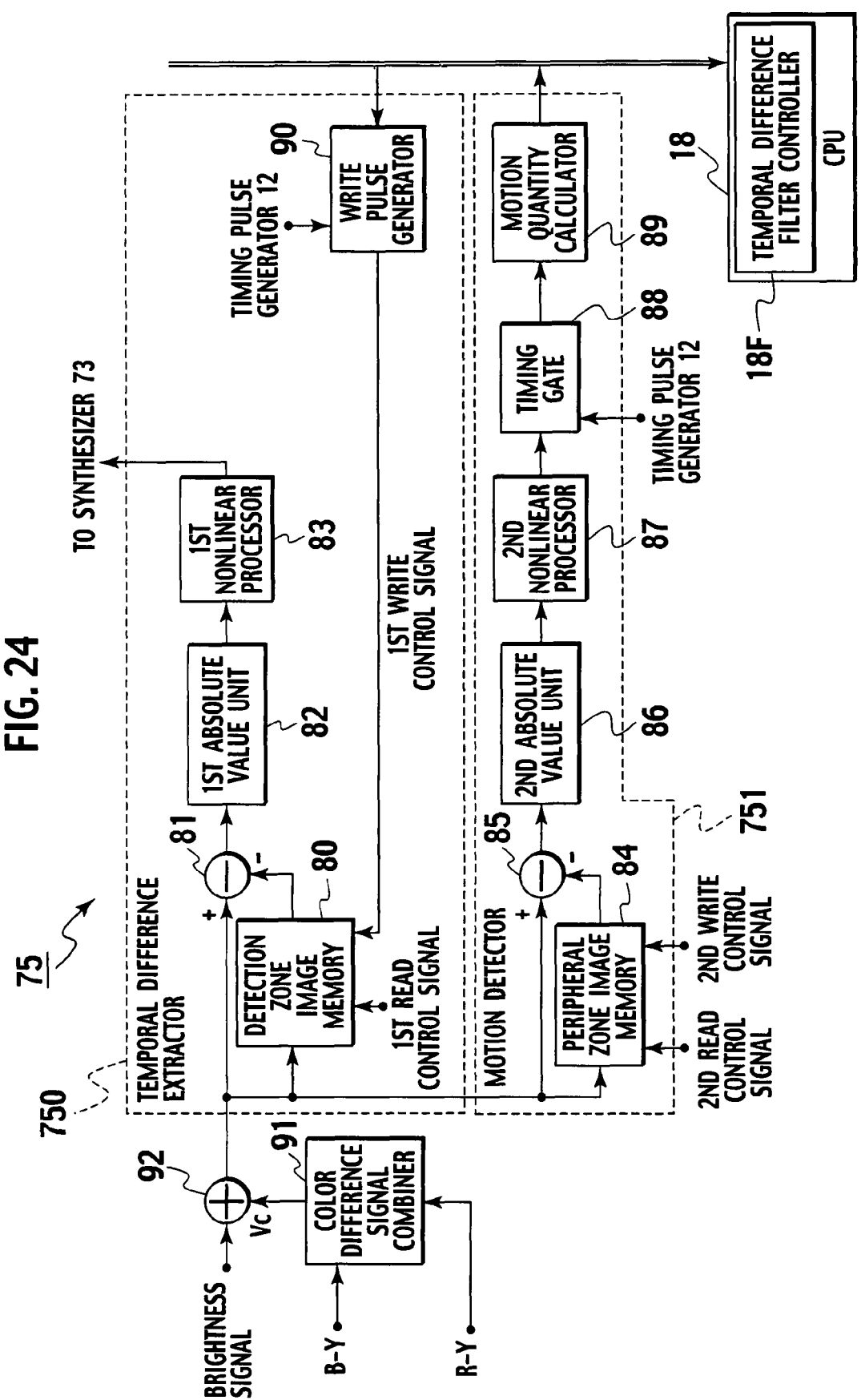
FIG. 24 is a block diagram showing an example of the temporal difference filter according to an embodiment of the present invention, arranged in the object extractor of FIG. 7.

FIG. 24 is a block diagram showing another example of the temporal difference filter 75 according to an embodiment of the present invention. In FIG. 24, the same parts as those of the example of FIG. 11 are represented with the same numerals. The embodiment of FIG. 24 additionally employs a color difference signal combiner 91 that combines color difference signals B−Y and R−Y contained in a mirror-converted image signal from the video camera 2 into a combined signal and an adder 92 that adds the combined signal to a brightness signal (Y signal) to form a single signal system. Based on color difference signals, the color difference signal combiner 91 generates a signal containing the hue and saturation degree Vc mentioned above. According to the embodiment of FIG. 24, the color difference signal combiner 91 provides a signal containing a saturation degree Vc.

The sum signal from the adder 92 is supplied to the detection zone image memory 80 and first subtracter 81 of the temporal difference extractor 750 and to the peripheral zone image memory 84 and second subtracter 85 of the motion detector 751.

The temporal difference filter 75 of the embodiment of FIG. 24 detects a hand quantity in the detection zone 45, and according to the hand quantity, determines whether or not the hand is in the detection zone 45. This determination is based on a difference between a background image containing no hand and an image containing the hand. The brightness signal, the color difference signals, and the combined signal of the brightness and color difference signals each are usable to detect a hand quantity. The combined signal is advantageous in obtaining the difference.

Even if the background image and hand image have the same gradation in their brightness signals, the temporal difference filter 75 of FIG. 24 can find a difference between the images if the color difference signals are different between the background image and the hand image. Even if the background image and hand image have the same color difference signals, the temporal difference filter 75 of FIG. 24 can find a difference between the images if the brightness signals are different between the background image and the hand image. In this way, the embodiment of FIG. 24 can detect a hand motion without regard to a background image, and therefore, is effective in a variety of environments.

According to the embodiments mentioned above, the temporal difference filter 75 consists of the temporal difference extractor 750 and motion detector 751. The motion detector 751 may be omitted to form the temporal difference filter 75 only with the temporal difference extractor 750. Providing the temporal difference filter 75 with the motion detector 751, however, is preferable to accurately detect a hand area in the detection zone 45.

Although the embodiments have been explained with a hand as an object to be detected, the object to be detected may be a remote control unit having a light emitting function, or a pattern emitted from a light emitter of a remote control unit, or the like. Namely, the present invention is applicable to detect any object.

It should be understood that many modifications and adaptations of the invention will become apparent to those skilled in the art and it is intended to encompass such obvious modifications and changes in the scope of the claims appended hereto.

What is claimed is:

1. An electronic appliance comprising:
    a display;
    a video camera configured to photograph an operator who is in front of the display;
    a mirror converter configured to form a mirror image of the image photographed by the video camera;
    an operational image generator configured to generate an operational image containing at least one control button;
    a mixer configured to mix the mirror image with the operational image into a mixed image;
    a detector configured to generate a detection signal representative of an operation conducted by the operator with an item of the operator with respect to the control button contained in the mixed image displayed on the display; and
    a controller configured to carry out a control operation according to the detection signal,
    the detector including:
        a first memory configured to store an image of a detection zone of the mirror image, the detection zone corresponding to the control button displayed on the display;

a second memory configured to store an image of a peripheral detection zone of the mirror image, the peripheral detection zone being defined around the detection zone, the second memory being different from the first memory;

a first subtracter configured to find a difference between a present image of the detection zone and the image stored in the first memory, and according to the difference, output an image signal indicative of an area of the item in the detection zone;

a second subtracter configured to find a difference between a present image of the peripheral detection zone and the image stored in the second memory, and according to the difference, output an image signal indicative of an area of the item in the peripheral detection zone, the second subtracter being different from the first subtracter;

a generator configured to generate the detection signal according to the image signal indicative of the area of the item in the detection zone output from the first subtracter;

a calculator configured to calculate, according to the image signal indicative of the area of the item output from the second subtracter, first data representative of the size of the item in the peripheral detection zone; and a write controller configured to control writing to the first memory according to the first data, and adapted to work for values of the first data greater than a prescribed value, to have the first memory stop writing the image of the detection zone, and for values of the first data smaller than the prescribed value, to have the first memory write the image of the detection zone, wherein the write controller stops writing the image of the detection zone to the first memory before the item enters the detection zone when the values of the first data exceed the prescribed value, and wherein the first memory stores a background image of the detection zone without having an image of the item before the item enters the detection zone, and wherein the first subtracter determines the difference between the present image of the detection zone having an image of the item and the background image stored in the first memory.

2. The electronic appliance of claim 1, wherein the write controller comprises:

a first flag generator configured to generate a first flag according to a period in which the first data is above a first threshold;

a second flag generator configured to calculate second data representative of the size of the item in the detection zone and generate a second flag according to a period in which the second data is above a second threshold; and a third flag generator configured to generate a write stop flag according to the first and second flags, to stop writing to the first memory.

3. The electronic appliance of claim 2, wherein:
the first flag generator generates the first flag a predetermined period after the first data exceeds the first threshold.

4. The electronic appliance of claim 3, wherein:
the first flag generator generates a fourth flag when the first data exceeds the first threshold; and
the third flag generator generates the write stop flag according to the first, second, and fourth flags.

5. The electronic appliance of claim 2, wherein:
the first flag generator generates a fifth flag according to a period in which the first data is above a third threshold; and
the controller stops the control operation according to the fifth flag.

6. The electronic appliance of claim 1, further comprising:
an adder configured to add brightness and color signals that form the mirror image to each other and provide a sum signal, the sum signal forming the images stored in the first and second memories.

* * * * *